United States Patent [19]
Ichikawa et al.

[11] Patent Number: 5,194,709
[45] Date of Patent: Mar. 16, 1993

[54] METHOD FOR CHECKING A SPOT WELDED PORTION AND SPOT WELDING MACHINE

[75] Inventors: Wataru Ichikawa, Tokyo; Yuji Matsuki, Sayama; Seiji Hirohashi, Tokyo; Masaru Ohara, Suzuka; Yasuyuki Mizutani, Suzuka; Yuji Taya, Suzuka; Toshiharu Nakagima, Yokkaichi; Shingi Hoshino, Suzuka, all of Japan

[73] Assignees: Kabushiki Kaisha SG; Honda Motor Co., Ltd., both of Tokyo, Japan

[21] Appl. No.: 770,419

[22] Filed: Oct. 3, 1991

[30] Foreign Application Priority Data

Oct. 8, 1990 [JP] Japan .............................. 2-270013
Oct. 8, 1990 [JP] Japan .............................. 2-270014
Jun. 28, 1991 [JP] Japan .............................. 3-185630

[51] Int. Cl.⁵ .............................................. B23K 11/25
[52] U.S. Cl. .................................................. 219/109
[58] Field of Search ................................. 219/109, 110

[56] References Cited

U.S. PATENT DOCUMENTS

| | | | |
|---|---|---|---|
| 3,546,421 | 12/1970 | Meyer et al. | 219/110 |
| 3,609,285 | 9/1971 | Scarpelli et al. | 219/109 |
| 4,028,522 | 6/1977 | Chihoski et al. | 219/109 |
| 4,542,277 | 9/1985 | Cecil | 219/109 |
| 4,734,555 | 3/1988 | Ferguson | 219/109 |
| 4,970,361 | 11/1990 | Fuse | 219/110 |

FOREIGN PATENT DOCUMENTS 53-4057 2/1978 Japan .

Primary Examiner—Clifford C. Shaw

[57] ABSTRACT

A decrease amount in plate thickness at a spot weld is detected at a predetermined time period when application of pressure is still maintained after termination of power supply to electrodes for spot welding. The decrease amount is correlated with the magnitude of diameter of nugget formed by spot welding, e.g., a larger diameter of nugget signifies a stronger the joint, and therefore, the quality of joint at the spot weld can be examined on the basis of the detected decrease amount. Since a value obtained by integrating plate thickness detection data of the spot weld during the predetermined time period is correlated, as the decrease amount is, with the magnitude of the diameter of a nugget, the quality of the joint may also be examined on the basis of this integrated value. There is provided, in a spot welding machine, a detector for detecting a stroke position of a cylinder for pressing electrodes or a detector for detecting a position of displacement of a tip portion of an arm interlocked with the movement of the electrodes and the distance between the electrodes, i.e., plate thickness, can be indirectly detected by the detector without adversely affecting efficiency of the spot welding work.

46 Claims, 16 Drawing Sheets

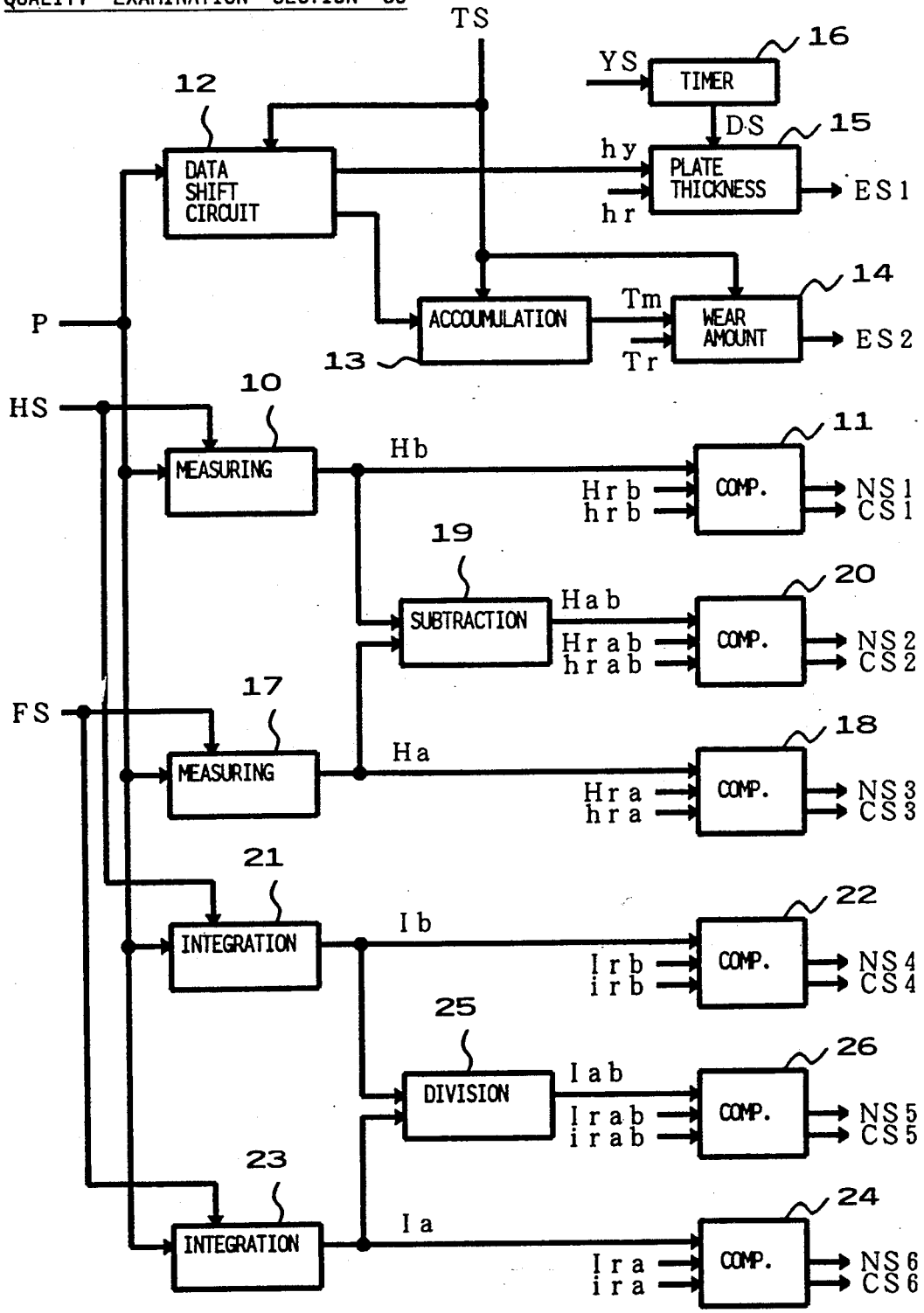
F I G. 5

METHOD FOR CHECKING A SPOT WELDED PORTION AND SPOT WELDING MACHINE

BACKGROUND OF THE INVENTION

This invention relates to a method for checking a spot welded portion for examining the quality of joint and a spot welding control system for controlling spot welding conditions by using this method.

The invention relates also to a spot welding machine for welding plates to be joined and, more particularly, to a spot welding machine capable of measuring thickness of plates between electrodes during spot welding.

Spot welding is suitable for welding thin metal plates efficiently and in a large quantity and is frequently employed in a production line system for products such as automobiles. In spot welding, however, it is not so easy to examine the quality of joint from appearance of a welded product as in gas welding or arc welding and there is no established method for checking the quality of joint without breaking a welded product.

Various studies and developments have therefore been made to realize a method for checking the quality of joint without breaking a welded product. One of these methods attempts to examining the quality of joint in a welded portion by measuring distance between welding electrodes (i.e., thickness of plates to be joined).

This prior art method will be described with reference to FIG. 10.

FIG. 10 shows a diagram showing states of change in the distance between electrodes in respective steps of spot welding.

Spot welding is performed in four steps initial pressing time (squeeze, time); power supply time, i.e. current supply time; hold time; and off time. The initial pressing time is a period of time between start of a application of pressing force to the electrodes and start of supply of current. Pressure between the electrodes is stabilized and plates to be joined are caused to conform to each other during this period of time. The power supply time, i.e. current supply time, is composed of a time period during which welding current is supplied, a time period during which preheating current is supplied and a time period during which tempering current is supplied to perform quenching after supply of welding current. The holding time is a period of time between the end of supply of current and a time point when the electrodes are disengaged from the welded plates. The off time is an interval between two spot welding processes when spot welding is repeatedly performed.

As will be apparent from the figure, the distance between the electrodes increases gradually after supply of current is started and is saturated at a maximum amount of change Hmax. During the hold time after the end of supply of current, the welded portion is cooled by the electrodes and the distance between the electrodes decreases sharply to a value which is proximate to the distance between the electrodes during the initial pressing time or even below this distance. When supply of current is continued after the distance between the electrodes has reached the maximum amount of change Hmax, fusing of the plates to be joined progresses and the distance between the electrodes starts to decrease gradually due to pressure between the electrodes but does not decrease sharply as when supply of current has ended as shown in the figure. Such change characteristic of the distance between the electrodes is an ideal one and an actual change characteristic varies in each spot welding with a resulting variation in the quality of joint in the welded plates.

As a method for examining the quality of control in spot welding by the maximum amount of change Hmax in the distance between the electrodes during supply of current obtained from this change characteristic curve, there is a method disclosed in Japanese Patent Publication No. 48-41422.

As a method for examining the quality of a joint by a rate of change (dh/dt) in the distance between the electrodes during an initial period of time in current supply, there is a method disclosed in U.S. Pat. No. 3,400,242.

As a method for examining the quality of a joint on the basis of both the maximum amount of change Hmax and the rate of change (dh/dt), there is a method disclosed in Japanese Patent Publication No. 53-4057.

An examination of an actual quality of a joint in a spot welding by using the prior art checking method has revealed that there is no clear correlation between the quality of joint and the maximum amount of change Hmax in the distance between electrodes during supply of current or the change rate (dh/dt) during an initial period of supply of current. In other words, there is a case where "poor quality of joint" results from the checking made on the basis of the maximum distance Hmax or change rate (dh/dt) notwithstanding that the quality of joint and welding strength which have been actually obtained are adequate or, conversely, a case where a "good quality of joint" results from such checking notwithstanding that the quality of joint and welding strength which have been actually obtained are poor.

Reliability of such checking method of a spot welding therefore is not sufficiently high and it is difficult to control welding conditions on the basis of results obtained by such checking method.

In a case where alloyed molten galvanized steel plates with a thickness of 0.65 mm are laid one upon the other and spot welded by using tip electrodes having a diameter of 5 mm under welding conditions of pressure of 170 kgf to 250 kgf and welding current 8600 A to 9800 A, the maximum amount of change Hmax is about 0.30 mm to 0.120 mm (30 $\mu$m to 120 $\mu$m). In order to realize the above described checking method of spot welding, therefore, the distance between the electrodes must be detected at an order of about 1 $\mu$m during spot welding. It is extremely difficult to detect, at such a high accuracy as 1 $\mu$m, the distance between electrodes through which current of several thousand amperes flows.

In the past, it has been experimentally performed to mount a linear sensor such as a potentiometer on an electrode holding member for a movable electrode of a spot welding machine and obtain relationship between displacement of the movable electrode (i.e., distance between the electrodes) and the quality of a joint in the spot welding by measuring the displacement of the movable electrode during spot welding by means of the linear sensor. It has however not been in practice to provide such linear sensor on a spot welding machine located on a production line. This is because the provision of a linear sensor on an electrode holding member causes hindrance to a welding work. Accordingly, there has not been a spot welding machine capable of performing a welding work while measuring change in the distance between electrodes and thereby checking the quality of a joint by spot welding because of lack in accuracy in the measurement of the distance between electrodes and difficulty in arranging a detector despite the fat that the above described various methods for checking spot welding have been proposed.

Further, in the past, a linear sensor such as a potentiometer has been experimentally mounted on an electrode holding member for a movable electrode of a spot welding machine and displacement of the movable electrode during welding has been measured by the linear sensor. This manner of mounting of a linear sensor is effective in a spot welding machine in which rigidity of an electrode holding member for a stationary electrode is so strong that the electrode holding means is not readily deformed by pressure applied thereto during welding. In a spot welding machine such as a portable type spot welding machine in which rigidity of arms which hold electrodes is not so strong or in a spot welding machine such as an X-shaped welding gun in which electrodes on both sides are movable, however, this manner of mounting of a linear sensor poses the problem that the distance between the electrodes cannot be detected accurately due to deformation of the arms.

SUMMARY OF THE INVENTION

It is therefore a first object of the invention to provide a method for checking a spot welded portion capable of accurately examining the quality of a joint at the spot welded portion.

It is a second object of the invention to provide a spot welding control system capable of establishing welding conditions automatically while maintaining a good quality joint at a spot welded portion.

It is a third object of the invention to provide a spot welding machine capable of detecting distance between electrodes during spot welding with a high accuracy without adversely affecting spot welding performances.

It is a fourth object of the invention to provide a spot welding machine capable of detecting distance between electrodes during spot welding with a high accuracy even if rigidity of arms holding the electrodes is weak.

For achieving the first object of the invention, a method according to the invention for checking the quality of spot welding performed for fixedly attaching at least two plates together by the steps of placing the plates on each other, holding the plates between two electrodes and supplying power to the electrodes while applying pressure to these plates, characterized in that said method comprises steps of: detecting a decrease in thickness of the plates at the spot welded portion thereof that occurs at a predetermined time period when application of pressure is still maintained after termination of power supply; and examining the quality of a joint at the spot welded portion on the basis of an amount of detected decrease.

For achieving also the first object of the invention, a method according to the invention for checking the quality of spot welding performed for fixedly attaching at least two plates together by the steps of placing the plates on each other, holding the plates between two electrodes and supplying power to the electrodes while applying pressure to these plates, characterized in that said method comprises steps of: obtaining a value based on integrating, during a predetermined time period when application of pressure is still maintained after termination of power supply, thickness of the plates at the spot welded portion which changes for said predetermined time period; and examining the quality of a joint at the spot welded portion on the basis of said value obtained based on the integration.

For achieving the second object of the invention, a spot welding control system according to the invention comprises examination means for examining the quality of a joint at the spot welded portion by the above described method and control means for controlling spot welding conditions on the basis of result of examination.

The distance between electrodes in spot welding increase gradually with lapse of the current supply time as shown by the curve C0 in FIG. 10 and the curve C1 in FIG. 2. In the case of FIG. 10, power supply, i.e., current supply, is terminated at a time point when the distance between the electrodes has reached the maximum amount of change Hmax. It is known, however, that the distance between the electrodes decreases instead of increasing by continuing, as shown in FIG. 2, supply of power, i.e., current, even after the distance between the electrodes has reached the maximum amount of change Hmax.

The distance between the electrodes decreases sharply during the hold time after the end of supply of current as shown in the curve C0 in FIG. 10 or the curve C1 in FIG. 2. Although these figures show a case where the distance between the electrodes during the hold time is larger than the distance between the electrodes during the initial pressing time, reverse may also be the case.

A nugget is formed between plates to be joined which have been fused by supply of current and the plates are tightly joined by forming of this nugget. A factor which influences most the forming of the nugget is an amount of energy (amount of heat) which has been applied to a spot welded portion during supply of current. It is however extremely difficult to measure the amount of energy which has actually been consumed in the forming of the nugget in the spot welded portion. This amount of energy cannot be obtained simply from the current supply time and magnitude of supplied current. Since states of surfaces and resistance of contact of plates to be joined and other factors vary subtly in each spot welding, the quality of a joint in a spot welded portion varies subtly even when the current of the same magnitude is supplied during the same length of time.

Accordingly, in the past, the amount of energy applied to a welded portion has been relatively detected by measuring change in plates to be joined during supply of current, i.e., the distance between the electrodes.

It is, however, in the hold time after the end of supply of current that nugget which finally determines the quality of joint in the spot welded portion is formed, and the welded portion is cooled by the electrodes during the hold time with resulting occurrence of decrease in the distance between the electrodes. When the diameter of the nugget formed is relatively large, the amount of energy which has been consumed for forming of the nugget is also large, so that the amount of decrease due to cooling is also large. Conversely, when the diameter of the nugget formed is relatively small, energy is dissipated to a cold metal portion surrounding the nugget so that the amount of energy which has been consumed for forming of the nugget is small and the amount of decrease due to cooling is also small.

The inventors of the present invention have conducted spot welding many times under different conditions and found that there is some correlation between the amount of decrease in thickness of plates in the spot welded portion at the predetermined time period when application of pressure is still maintained after termination of power supply (this predetermined time period corresponds to the above described hold time) and the magnitude of the nugget diameter during spot welding.

Therefore, according to a first aspect of the checking method according to the invention, the amount of decrease in thickness of plates at a spot welded portion during the predetermined time period is detected and the quality of a joint at the spot welded portion is examined on the basis of this amount of decrease. By this arrangement, detection data which is correlated with the diameter of nugget formed by spot welding can be obtained from the amount of decrease in thickness of plates and, accordingly, the quality of a joint at spot welding can be examined with a high accuracy.

It has also been found that a value resulting from integrating, during the predetermined time period when application of pressure is still maintained after termination of power supply, thickness of plates at a spot welded portion which changes during the predetermined time period has a correlation with the magnitude of the diameter of nugget at the spot welded portion.

Therefore, according to a second aspect of the checking method according to the invention, the above described integrated value is obtained. By this arrangement, detection data which is correlated with the diameter of nugget formed in spot welding can be obtained on the basis of this integrated value, so that the quality of a joint can be examined with a high accuracy.

According to the spot welding control system of the invention, welding conditions in spot welding are determined by employing result of examination of the quality of a joint by the above described method for checking a spot welded portion, so that spot welding can be performed while controlling the welding conditions so that, when the welding conditions have been found to be unsatisfactory, they will be changed to satisfactory conditions. Therefore, a spot welding system which can always perform spot welding bringing about an excellent joint can be obtained.

For achieving the third object of the invention, a spot welding machine according to the invention comprises first and second tip electrodes for holding therebetween plates to be joined with a pressing force of a predetermined magnitude and causing current to flow through these plates; first and second arms for supporting the first and second tip electrodes and transmitting the pressing force of the predetermined magnitude to these tip electrodes; a pressing cylinder for moving at least one of the first and second arms to apply the pressing force to said plates via said tip electrodes; and distance-between-electrodes detection means for detecting distance between the first and second tip electrodes by detecting a stroke position of the pressing cylinder.

For achieving the fourth object of the invention, a spot welding machine according to another aspect of the invention comprises first and second tip electrodes for holding therebetween plates to be joined with a pressing force of a predetermined magnitude and causing current to flow through these plates; first and second arms for supporting the first and second tip electrodes and transmitting the pressing force of the predetermined magnitude to these tip electrodes; pressing means for moving at least one of the first and second arms to apply the pressing force to said plate via said tip electrodes; and distance-between-electrodes detection means for detecting distance between the first and second tip electrodes by detecting displacement of the first and second arms relative to the plates, said arms being moved in accordance with expansion and contraction of the plates during welding.

As shown by the curve C0 in FIG. 10, the distance between electrodes in spot welding increases gradually with lapse of the current supply time and decreases upon the end of supply of current notwithstanding that a predetermined pressure is applied between the tip electrodes.

A pressing force produced by the pressing cylinder is transmitted to the tip electrodes through the first and second arms throughout the initial pressing time, current supply time and hold time in spot welding. The change in the distance between the tip electrodes during the current supply time signifies that pressure acting in a direction opposite to the direction of pressing force is generated by the supply of current and this pressure moves the tip electrodes in the opposite direction to the pressing force. This pressure in the opposite direction is caused by expansion of a welded portion, temperature of which has risen due to welding current flowing through plates to be joined. The pressure in the opposite direction caused by supply of current therefore is transmitted to the pressing cylinder through the first and second arms and causes the rod of the pressing cylinder to move in a direction opposite to the pressing direction of the rod. Conversely, during the hold time, the welded portion is pressed and cooled so that it shrinks gradually. The rod of the pressing cylinder is moved in the same direction as the pressing direction by this shrinkage of the welded portion.

In other words, the stroke position of the pressing cylinder changes following change in the distance between the tip electrodes. According to the spot welding machine of the invention, the distance between the tip electrodes which moves during the current supply time can be detected by detecting the displaced position of the rod of the pressing cylinder by the distance-between-electrodes detection means. Since the distance-between-electrodes detection means according to the invention thus detects the distance between the tip electrodes by detecting the displaced position of the rod of the pressing cylinder, the problem in the prior art spot welding machine that the provision of the distance-between-electrodes detection means causes hindrance to the spot welding work can be overcome and the third object of the invention can thereby be achieved.

The above described spot welding machine according to the invention is effective in a case where the spot welding machine is one in which change in the order of several tens $\mu m$ in the distance between electrodes which changes during the current supply time is transmitted accurately to the rod of the pressing cylinder without flexion of the first and second arms. There is, however, a conceivable case where rigidity of the first and second arms is not sufficiently large due to structure of a spot welding machine so that change in the distance between electrodes in the order of several tens $\mu m$ during the current supply time is absorbed by flexion of the arms and the movement of the rod of the pressing cylinder therefore is reduced.

Therefore, according to another aspect of the spot welding machine of the invention, there is provided the distance-between-electrodes detection means for detecting distance between the first and second tip electrodes by detecting the amount of displacement of the first and second arms relative to the plate. By detecting the amount of displacement of the first and second arms themselves, the distance between the electrodes can be accurately detected even when rigidity of the arms is not sufficiently large to prevent flexion of the arms.

In one preferred embodiment of the invention, the distance-between-electrode detection means comprises first and second position detection arms connected rotatably at one end thereof to the first and second arms in such a manner that the first and second position detection arms are rotated about their pivot points in accordance with movement of the first and second arms, distance-between-arms detection means provided between the first and second position detection arms for detecting the amount of displacement of the first and second arms with respect to the plates to be joined by detecting an amount of displacement of the first and second position detection arms which are rotated in accordance with movement of the first and second arms.

The two position detection arms are provided separately from the first and second arms for transmitting the pressing force to the tip electrodes. These position detection arms are connected rotatably at one end thereof to the first and second arms in such a manner that the first and second position detection arms are rotated about their pivot points in accordance with movement of the first and second arms and, accordingly, when the distance between electrodes has changed during the current supply time and the first and second arms have flexed, the position detection arms are rotated about their pivot points in accordance with the amount of movement of the first and second arms which have moved due to the flexion. Since the distance-between-arms detection means is provided between the first and second position detection arms and detects the amount of displacement of the first and second arms which are rotated by movement of the first and second arms, a subtle change in the order of several tens μm in the distance between the electrodes can be detected with a high accuracy even when the first and second arms are flexed during welding.

Another preferred embodiment of the distance-between-electrode detection means comprises first and second detection means mounted on the first and second arms for detecting the amount of displacement of the first and second arms with respect to the plates.

During spot welding, plates to be joined normally exist between a first electrode and a second electrode. In a case where the distance between the electrodes has changed due to expansion or contraction of plates to be joined between the electrodes in the order of several tens μm, the first and second arms are moved also following expansion or contraction of the plates to be joined. It is however only the plates to be joined in a portion held between the first and second electrodes that expands or contracts and the remaining portion of the plates is not deformed. Since the detection means is mounted on each of the first and second arms and detects distance between the position of mounting on the first and second arms and the plates to be joined which are not deformed, a subtle change in the distance between the electrodes in the order of several tens μm can be detected with high accuracy even when the first and second arms are flexed during welding.

In the above described manner, according to the spot welding machine of the invention, change in the distance between electrodes during spot welding can be detected with high accuracy, so that examination of the quality of joint at a spot welded portion which has been extremely difficult in the prior art systems can be made readily and accurately.

BRIEF DESCRIPTION OF THE DRAWINGS

In the accompanying drawings,

FIG. 5 is a block diagram showing another embodiment of the quality examination section for realizing the method for checking a spot welded portion according to the invention;

DETAILED DESCRIPTION OF PREFERRED EMBODIMENTS

Figure 3:
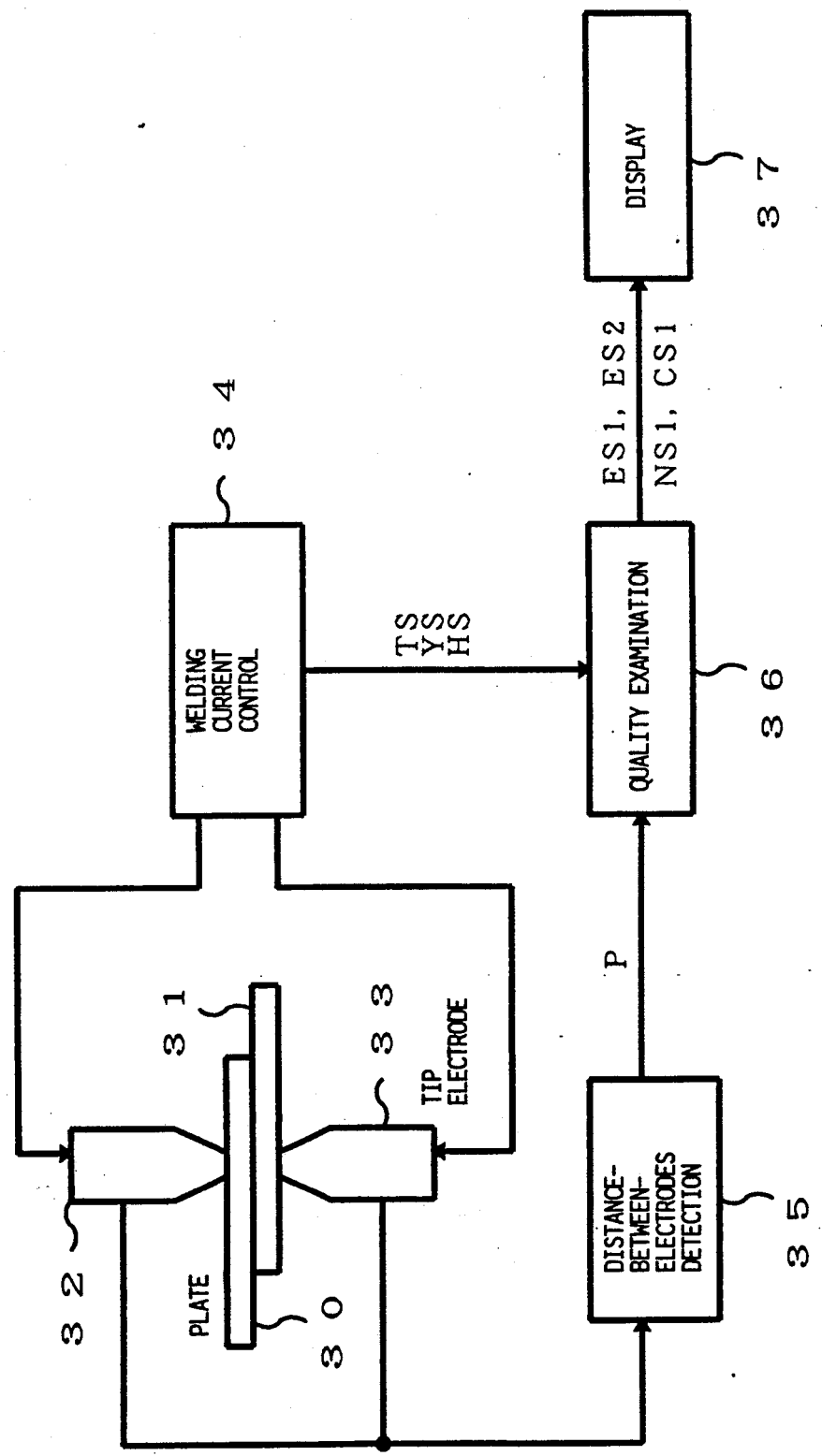
FIG. 3 is a block diagram showing schematically an embodiment of an examination device for realizing the method for checking a spot welded portion according to the invention.

FIG. 3 schematically shows the entire structure of the examination device for realizing the method for checking spot welding according to the invention.

Two plates 30 and 31 to be joined are welded to each other by spot welding. The two plates 30 and 31 are held in their portions which are superposed one upon the other by two tip electrodes 32 and 33.

The tip electrodes 32 and 33 are provided on both sides of the plates 30 and 31 and press the plates 30 and 31 with a predetermined pressure.

Figure 2:
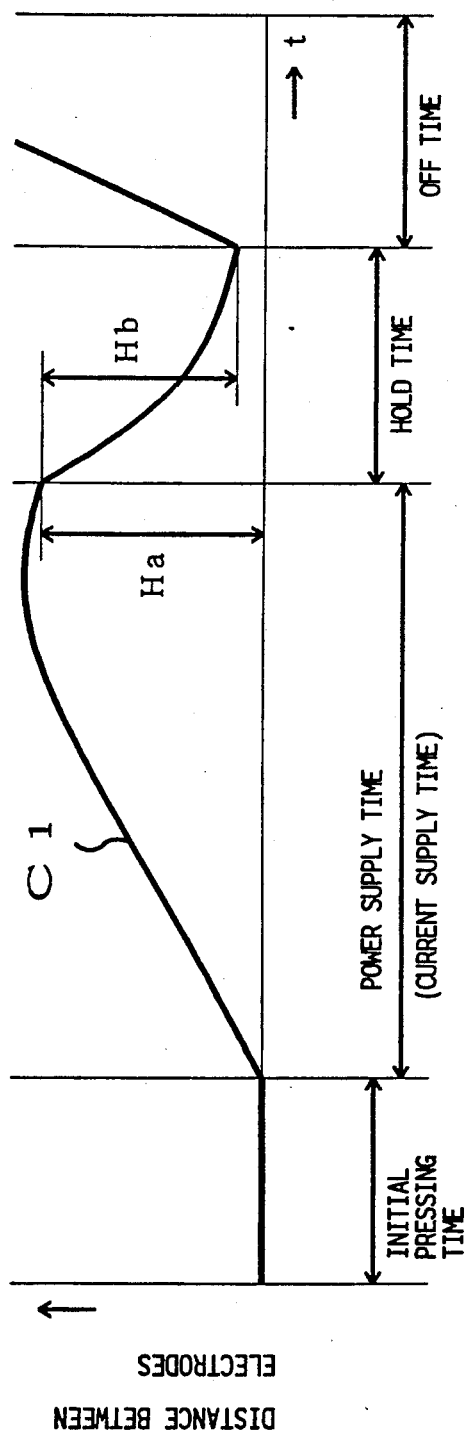
FIG. 2 is a graph showing a characteristic of change in the distance between electrodes during spot welding for explaining the principle of the method for checking a spot welded portion according to the invention.

A welding current control section 34 supplies power to the tip electrodes 32 and 33 for flowing welding current through the plates 30 and 31 during the current supply time shown in FIG. 2 and also controls pressing force (welding force) of the tip electrodes 32 and 33.

A distance-between-electrodes detection section 35 detects an absolute position of distance between the tip electrodes 32 and 33 and supplies the absolute position as a distance-between-electrodes signal P to a quality examination section 36. Although not illustrated, there are provided, on the tip electrodes 32 and 33, position detectors for detecting the absolute position between the tip electrodes 32 and 33.

The quality examination section 36 receives the distance-between-electrodes signal P from the distance-between-electrodes detection section 35 and a hold time signal HS from the welding current control section 34, detects change in the distance-between-electrodes signal P during the hold time, examines the quality of a joint in the spot welding portion by comparing the detected value of change in the signal P with a reference value, and supplies a bad signal NS1 to a display section 37 when the quality of joint has been found to be poor. When the value of the distance-between-electrodes signal P is extremely small, it is considered that some malfunction has taken place between the tip electrodes 32 and 33 and a tip change signal CS1 is supplied to the display section 37. Further, the quality examination section 36 examines whether or not the thickness of the plates 30 and 31 which are superposed one upon the other is within a predetermined range. More specifically, when the number of plates has exceeded of falls short of the correct number of two for some reason or when an impure material has been unexpectedly mixed between the plates 30 and 31, the quality examination section 36 issue a plate thickness error signal ES1 for informing about the bad condition in the portion to be spot welded. Since the tip portions of the tip electrodes 32 and 33 are gradually worn off by repeating of spot welding, the quality examination section 36 detects the amount of wear of the tip portions and produces a tip change signal ES2.

Upon receipt of the bad signal NS1, plate thickness error signal ES1 and tip change signals ES2 and CS1 from the quality examination section 36, the display section 37 performs displays and alarms necessary for informing the operating person of these states.

Figure 1:
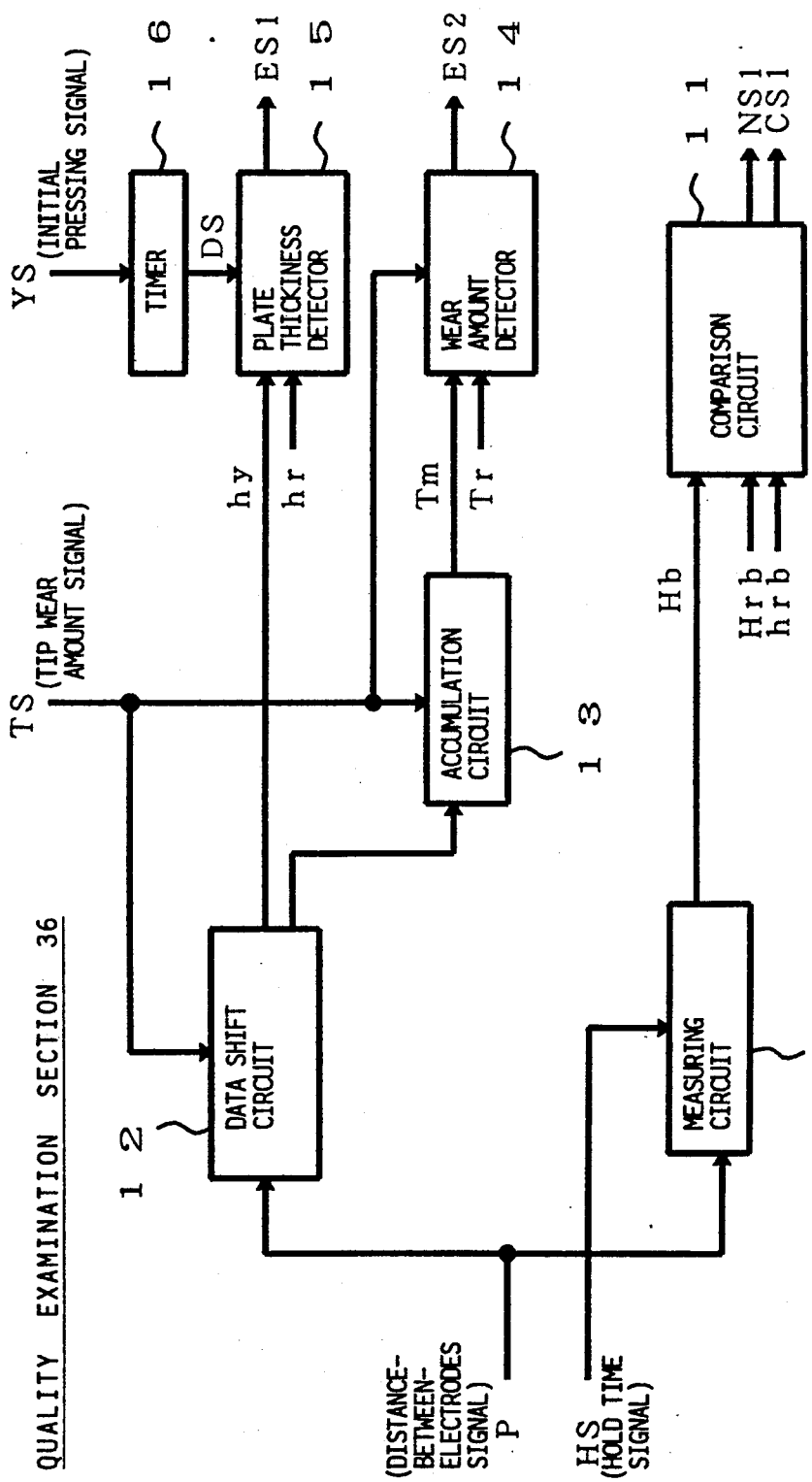
FIG. 1 is a block diagram showing en example of a quality examination section for realizing the method for checking a spot welded portion according to the invention.
Figure 4:
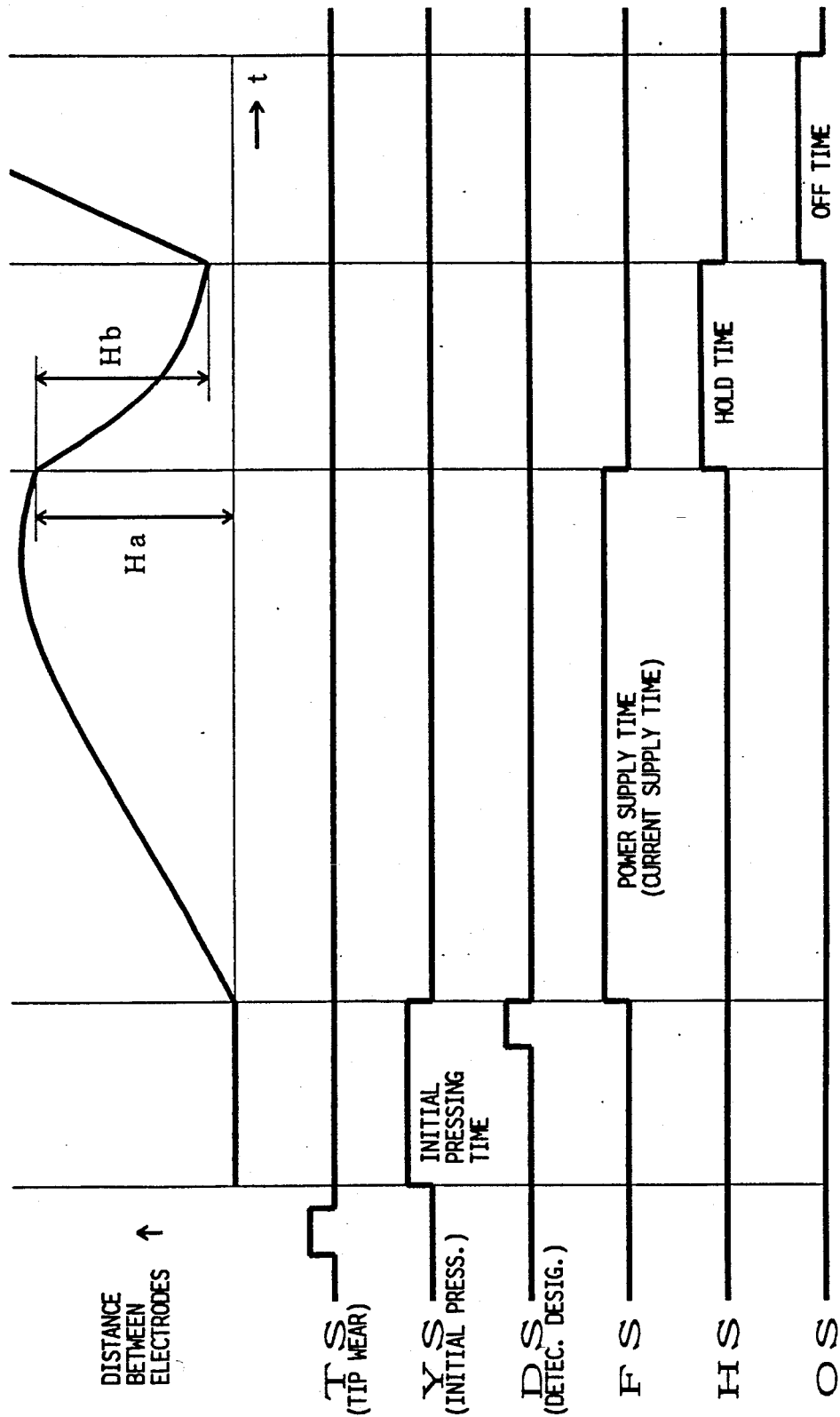
FIG. 4 is a time chart for explaining the operation of the quality examination section of FIG. 1.

The quality examination section 36 in FIG. 3 will be described more fully with reference to FIGS. 1 and 4. FIG. 1 shows the structure of the quality examination section 36 and FIG. 4 is a time chart showing its operation.

In this embodiment, the quality of a joint is examined by a measuring circuit 10 and a comparison circuit 11.

The measuring circuit 10 receives the distance-between-electrodes signal P from the distance-between-electrodes detection section 35, resets an internal register upon rising edge of the hold time signal HS, measures the amount of charge in the distance-between-electrodes signal P during a time period until the hold time signal HS falls and supplies the measured amount as a change-during-hold-time (decrease amount, i.e., contraction amount) Hb to the comparison circuit 11.

The comparison circuit receives the contraction amount Hb, compares it with a reference contraction value Hrb and a tip change reference contraction value hrb for change of the tip electrode, produces the bad signal NS1 when the contraction amount Hb has not reached the reference contraction value Hrb and produces the tip change signal CS1 when the contraction amount Hb has not reached the tip change reference contraction value hrb. Since the tip change reference value hrb is sufficiently smaller than the reference contraction value Hrb and the fact that the contraction amount Hb has not reached the tip change reference value hrb signifies that some malfunction has taken place between the tip electrodes 32 and 33, the tip change signal CS1 urging change of the tip electrodes is produced.

The amount of wear of the tip electrodes 32 and 33 is detected by a data shift circuit 12, an accumulation circuit 13 and a wear amount detector 14. The number of plates to be joined and other factors are detected by a plate thickness detector 15 and a timer 16.

The data shift circuit 12 compensates plate thickness detection data in accordance with the amount of wear of the tip electrodes. The data shift circuit 12 receives the distance-between-electrodes signal P from the distance-between-electrodes detection section 35, shifts the data in response to a tip wear amount detection signal TS so as to bring the value of the distance-between-electrodes signal P to "0", supplies the shifted amount to the accumulation circuit 13 and supplies to the plate thickness detector 15 a plate thickness signal hy representing real distance between the electrodes after the shifting. Since the distance-between-electrodes signal P produced by the distance-between-electrodes detection section 35 is a signal representing the absolute position between the electrodes 32 and 33, this signal P becomes smaller than the actual distance between the electrodes due to wear of the tip portions of the tip electrodes when spot welding has been repeated several hundred times, so that accurate detection of the distance between the electrodes become impossible. For preventing such difficultly, the tip wear amount detection signal TS is generated in accordance with the predetermined standard to cause the tip electrodes 32 and 33 to contact the plates 30 and 31 in response to this signal TS and shift the value of the distance-between-electrodes signal P corresponding to the amount of wear in the data shift circuit 12.

In a case where, for example, the distance P between the tip electrodes 32 and 33 when the tip electrodes 32 and 33 are initially in contact with the plates 30 and 31 is "0" and the distance P after repetition of spot welding for 200 times is "−3", the data shift circuit 12 makes shifting by "+3" to compensate this "−3" and thereupon produces the plate thickness signal hy which is "0".

The accumulation circuit 13 inputs the shift amount of the data shift circuit 12 at a timing of rising edge of the tip wear amount detection signal TS, accumulates the input shift amount and supplies a wear amount signal Tm to the wear amount detector 14. Accordingly, the accumulation circuit 13 stores the entire wear amount of the tip electrodes which have been worn off by spot welding.

The wear amount detector 14 inputs the wear amount signal Tm stored in the accumulation circuit 13, compares it with a reference wear value Tr and, when the wear amount signal Tm has reached the reference wear value Tr, produces the tip change signal ES2.

The plate thickness detector 15 inputs the plate thickness signal hy from the data shift circuit 12 and compares it with the reference plate thickness value hr. When the plate thickness signal hy is within a range of 10% of the reference plate thickness hr, the plate thickness is deemed to be normal and, when the plate thickness signal hy is out of the range of 10% of the reference plate thickness hr, the plate thickness detector 15 produces the plate thickness error signal ES1. Since the reference plate thickness value hr is a value representing thickness of the two superposed plates 30 and 32 to be spot welded, outputting of the plate thickness error signal ES1 indicates that some trouble has taken place such, for example, that the number of plates to be joined is one or three or that some foreign matter is interposed between the plates to be join. When the plate thickness error signal ES1 has been produced, therefore, a step should be taken to remove the trouble after stopping the spot welding work.

The timer 16 generates a plate thickness detection designation signal DS which constitutes a timing signal for enabling detection by the plate thickness detector 15. The plate thickness detection operation by the plate thickness detector 15 needs to be made at a time point when the pressure applied to the electrode is stable within the initial pressing time between start of application of the pressing force to the electrodes and start of supply of current. Therefore, the timer 16 counts a predetermined time length upon receipt of the initial pressing signal YS and supplies the plate thickness detection designation signal DS for detecting the plate thickness within the initial pressing time to the plate thickness detector 15.

The operation of the quality examination section 36 shown in FIG. 1 will now be described by referring to the time chart of FIG. 4.

By way of example, the tip wear amount detection designation signal TS is generated every 200 times of spot welding. The data shift circuit 12 performs shifting at a timing of rising of the tip wear amount detection designation signal TS so as to bring the value of the distance-between-electrodes signal P to "0". The accumulation circuit 13 accumulates the shift amount of the data shift circuit 12 at a timing of falling of the tip wear amount detection signal TS and the wear amount detector 14 compares the wear amount signal Tm from the accumulation circuit 13 with the reference wear amount value Tr.

At a timing of rising edge of the initial pressing signal YS, the timer 16 starts counting of the predetermined time length and supplies the plate thickness detection designation signal DS to the plate thickness detector 15 at the end of counting. During generation of this initial pressing signal YS (i.e., the initial pressing time), a predetermined pressing force is applied to the tip electrodes 32 and 33.

Simultaneously with generation of the plate thickness detection designation signal DS from the timer 16, the plate thickness detector 15 compares the plate thickness signal hy from the data shift circuit 12 with the plate thickness reference value hr.

When the plate thickness error signal ES1 from the plate thickness detector 15 or the tip change signal ES2 from the wear amount detector 14 is not provided, the welding current control section 34 supplies welding current of a predetermined magnitude to the tip electrodes 32 and 33 in response to the current supply signal FS.

The measuring circuit 10 resets the contents of the internal register at a timing of rising edge of the hold time signal HS and finishes measuring at a timing of falling of the hold time signal HS. The measuring circuit 10 thereby measures the contraction amount Hb of the plates 30 and 31 to be joined which have contracted during the hold time, i.e., the amount of change in the distance between the electrodes. For example, the measuring circuit 10 holds the value of the distance-between-electrodes signal P at a timing of rising edge of the hold time signal HS as P0, subtracts a value P1 of the distance-between-electrodes signal P at a timing of falling of the hold time signal HS from the value P0 and outputs a value P0−P1 as the contraction amount Hb.

The comparison circuit 11 compares the contraction amount Hb with the reference contraction value Hr. When the contraction amount Hb exceeds the reference contraction value Hr, the quality of joint a is good and when the contraction amount Hb has not reached the reference contraction value Hr, the quality of a joint is bad and the bad signal NS1 is produced.

In response to a release signal OS, the tip electrodes 32 and 33 release the plates 30 and 31 to be joined.

In response to a series of signals from the initial pressing signal YS to the release signal OS, the welding current control section 34 repeats spot welding. The welding current control section 34 generates also the tip wear amount detection designation signal TS during an interval time between spot welding processes every 200 times of spot welding for detecting the amount of wear of the tip electrodes 32 and 33.

In the embodiment of FIG. 1, the quality examination section 36 examines the quality of a joint on the basis of the contraction amount Hb in the distance P between the electrodes during the hold time. Alternatively, a distance Ha between the electrodes at a time point immediately after the end of supply of current (a time point when the hold time starts) shown in FIG. 2, a value Ia (area SA) resulting from integrating the amount of change in the distance between the electrodes during the current supply time and a value Ib (area SB) resulting from integrating the amount of change in the distance between the electrodes which with respect to the distance at a time point immediately after the end of the current supply time shown respectively in FIG. 6 may be obtained and a predetermined operation may be performed for these values to detect the quality of a joint.

The latter embodiment will be described with reference to FIG. 5. In FIG. 5, the same components as those in FIG. 1 are designated by the same reference characters and description thereof will be omitted.

A measuring circuit 17 receives the distance-between-electrodes signal P from the distance-between-electrodes detection section 35, resets its internal register at a timing of rising edge of the current supply signal FS, measures the amount of change in the distance-between-electrodes signal P until falling of the current supply signal FS and supplies the amount of change to a comparison circuit 18 as the current supply time change amount Ha.

The comparison circuit 18 receives the current supply time change amount Ha, compares it with a reference change value Hra and reference tip change value hra and produces a bad signal NS3 when the current supply time change amount Ha has not reached the reference change value Hra and a bad signal CS3 when the current supply time change amount Ha has not reached the reference tip change value hra. The reference change value Hra is a value which is sufficiently larger than the reference tip change value hra and the fact that the current supply time change amount Ha has not reached the reference change value Hra signifies that expulsion and surface flash have occurred during spot welding with the result that the amount of change in the distance between the electrodes has dropped sharply. In this case, the bad signal NS3 therefore is produced. Likewise, the fact that the current supply time change amount Ha has not reached the reference tip change value hra signifies that some trouble has taken place in the electrode 32 or 33 and, therefore, the tip change signal CS3 requesting for replacement of the tip electrodes is produced.

A subtraction circuit 19 receives the contraction amount Hb from the measuring circuit 10 and the current supply time change amount Ha from the measuring circuit 17 and supplies a value (Ha−Hb) resulting from subtracting the contraction amount Hb from the current supply time change amount Ha as a subtraction signal Hab to a comparison circuit 20. This subtraction signal Hab represents the final plate thickness of the plates 30 and 31 to be joined which have been deformed by spot welding and assumes either a negative value or a positive value. When the subtraction signal Hab is a negative value, the absolute value of the contraction amount Hb is larger than the absolute value of the current supply time change amount Ha and this signifies that the plate thickness of the plates 30 and 31 has contracted due to spot welding. When the subtraction signal Hab is a positive value, the absolute value of the contraction amount Hb is smaller than the absolute value of the current supply time change amount Ha and this signifies that the plate thickness of the plates 30 and 31 has expanded due to spot welding.

When this subtraction signal Hab is a negative value, the quality of a joint is good. When the subtraction signal Hab is a positive value, the nearer to zero the signal is, the better the quality of a joint is. Therefore, the comparison circuit 20 examines whether or not the value of the subtraction signal Hab is smaller than a predetermined reference value.

The comparison circuit 20 receives the subtraction signal Hab, compares it with a reference change value Hrab and a reference tip change value hrab and produces the bad signal NS2 when the subtraction signal Hab is not smaller than the reference change value Hrab and the tip change signal CS2 when the subtraction signal Hab is not smaller than the reference tip change value hrab. The reference tip change value hrab is a value which is sufficiently larger than the reference change value Hrab and the fact that the subtraction signal Hrab has not become smaller than the reference change value Hrab signifies that a proper melting has not occurred during spot welding and nugget having a diameter larger than a predetermined value has not been formed. In this case, therefore, the bad signal NS2 is produced. The fact that the subtraction signal Hab has not become smaller than the reference tip change value hrab signifies that some trouble has taken place in the tip electrode 32 or 33, so that the tip change signal CS2 requesting for replacement of the tip electrodes is produced.

Figure 6:
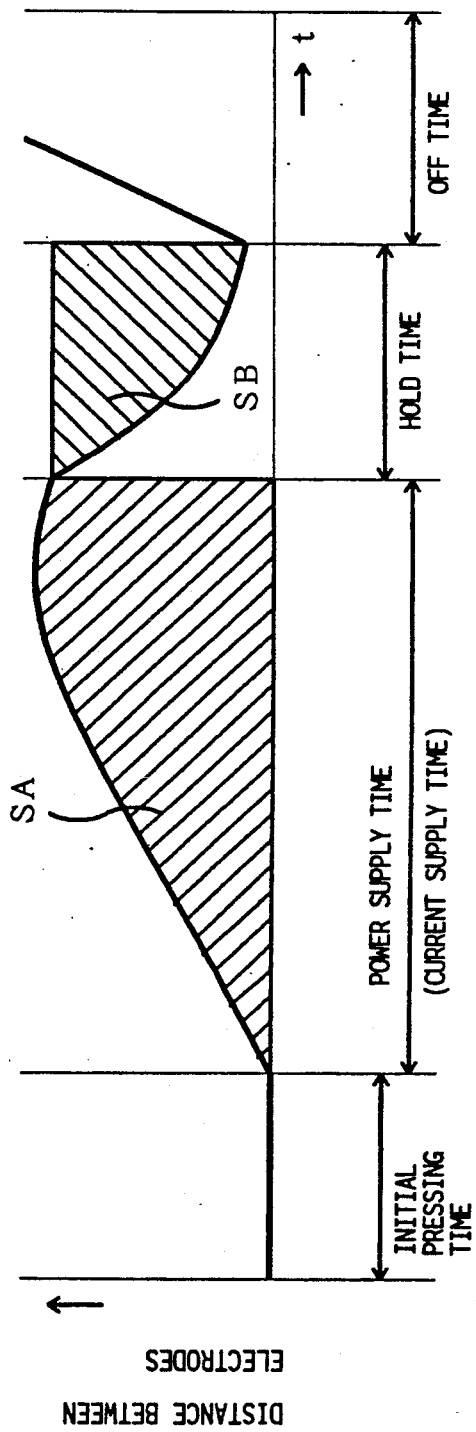
FIG. 6 is a graph showing a characteristic of change in the distance between electrodes during spot welding for explaining the operation of the quality examination section shown in FIG. 5.

An integration circuit 21 receives the distance-between-electrodes signal P from the distance-between-electrodes section 35, integrates the amount of change in the distance-between-electrodes signal P during the hold time from rising edge of the hold time signal HS till falling thereof with respect to the distance between the electrodes at a time point immediately after the end of the current supply time, and supplies the value of the area SB in FIG. 6 as the hold time integrated value Ib to a comparison circuit 22.

The comparison circuit 21 receives the hold time integrated value Ib, compares it with a reference hold time integrated value Irb and a reference tip change value irb and produces a bad signal NS4 when the hold time integrated value Ib has not reached the reference hold time integrated value Irb and a tip change signal CS4 when the hold time integrated value Ib has not reached the tip change reference value irb. The reference tip change value irb is a value which is sufficiently smaller than the reference hold time integrated value Irb and the fact that the hold time integrated value Ib has not reached the reference tip change value irb signifies that some trouble has taken place in the tip electrode 32 or 33. In this case, therefore, the tip change signal CS4 requesting for replacement of the tip electrodes is produced.

An integration circuit 23 receives the distance-between-electrodes signal P from the distance-between-electrodes detection section 35, integrates the amount of change in the distance-between-electrodes signal P during the current supply time from rising edge of the current supply signal FS till falling thereof with respect to the distance between the electrodes at a time point immediately after start of supply of current and supplies the value of the area SA in FIG. 6 as the current supply time integrated value Ia to a comparison circuit 24.

The comparison circuit 24 receives the current supply time integrated value Ia, compares it with a reference current supply time integrated value Ira and a reference tip change value ira, and produces a bad signal NS6 when the current supply time integrated value Ia has not reached the reference current supply time integrated value Ira and a tip change signal CS6 when the current supply time integrated value Ia has not reached the reference tip change value ira. The reference current supply time integrated value Ira is a value which is sufficiently larger than the reference tip change value ira and the fact that the current supply time integrated value Ia has not reached the reference current supply time integrated value Ira signifies that expulsion and surface flash have taken place during spot welding with the result that the amount of change in the distance between the electrodes has dropped sharply. In this case, therefore, the bad signal NS6 is produced. The fact that the current supply time integrated value Ia has not reached the reference tip change value ira signifies that some trouble has taken place in the electrode 32 or 33, so that the tip change signal CS6 requesting for replacement of the tip electrodes is produced.

A division circuit 25 receives the hold time integrated value Ib and the current time integrated value Ia from the integration circuits 21 and 23 and supplies a value (Ib/Ia) obtained by dividing the hold time integrated value Ib by the current time integrated value Ia as a division signal Iab to a comparison circuit 26.

The comparison circuit 26 receives the division signal Iab, compares it with a reference division value Irab and a reference tip change value irab and produces a bad signal NS5 when the division signal Iab is smaller than the reference division value Irab and a tip change signal CS5 when the division signal Iab is smaller than the reference tip change value irab. The reference tip change value irab is a value which is sufficiently smaller than the reference division value Irab and the fact that the division signal Iab has not become larger than the reference division value Irab signifies that a proper melting has not occurred during spot welding and nugget having a diameter larger than a predetermined value has not been formed. In this case, therefore, the bad signal NS5 is produced. The fact that the division signal Iab has not become larger than the reference tip change signal irab signifies that some trouble has taken place in the tip electrode 32 or 33 so that the tip change signal CS5 requesting for replacement of the tip electrodes is produced.

In the embodiment of FIG. 5, the bad signals NS1 to NS6 indicating the bad quality of a joint are provided as signals of the same level. Alternatively, these bad signals NS1 to NS6 may be provided with weight and a sum of weights of these signals may be provided as a signal indicating the bad quality of a joint. For example, weight of the bad signal NS1 is assumed to be "10", weight of the bad signal NS4 "8", weight of the bad signal NS2 "6", weight of the bad signals NS3 and NS6 "4" and weight of the bad signal NS5 "2" respectively and the quality of a joint is judged depending upon whether a total sum of the weights of these signals is larger than "15" or not. As regards the tip change signals CS1 to CS6, necessity for replacement of the tip electrodes is indicated by generation of any of the tip change signals CS1 to CS6, so that a logical sum signal of the respective output signals is provided.

As described above, in the embodiment of FIG. 5, the quality of a joint in spot welding is detected on the basis of various values which are obtained from the curves representing change characteristics in the distance between the electrodes in FIGS. 2 and 6. In any case, however, the basic value is the distance between the electrodes during the hold time.

Accordingly, the quality examination section 36 may examine the quality of a joint on the basis of the value Ib (area SB) obtained by integrating the distance between the electrodes which has changed with respect to the distance between the electrodes at a time point immediately after the end of the current supply time as shown in FIG. 6 instead of examining the quality of a joint on the basis of the contraction amount Hb in the distance P between the electrodes during the hold time. In other words, the measuring circuit 10 and the comparison circuit 11 in FIG. 1 may be substituted by the measuring circuit 21 and the comparison circuit in FIG. 5.

The quality examination section 36 may be constructed only of the measuring circuits 10 and 17, operation circuit 19 and comparison circuits 11, 18 and 20 of the embodiment shown in FIG. 5 or only of the integration circuits 21 and 23, division circuit 25 and comparison circuits 22, 24 and 26.

An embodiment of the spot welding control system using the above described checking method of spot welding will now be described.

Figure 7:
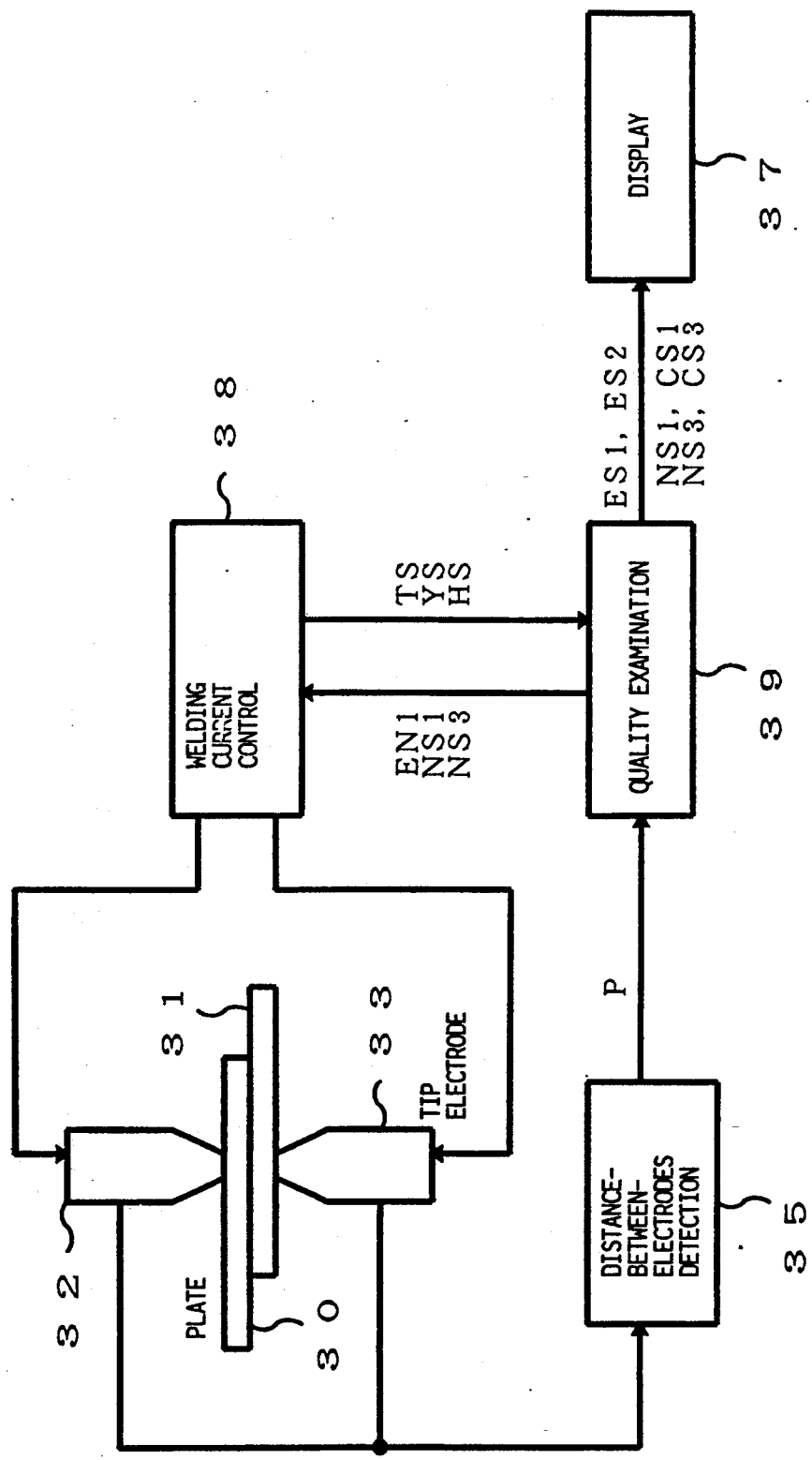
FIG. 7 is a block diagram showing schematically an embodiment of the spot welding control system according to the invention.

FIG. 7 shows schematically entire structure of the spot welding system. In FIG. 7, the same component parts as those in FIG. 3 are designated by the same reference characters and description thereof will be omitted. It is a feature in the present embodiment that a quality examination section 39 examines the quality of a joint and supplies a current supply end signal EN1, bad signals NS1 and NS3 to a welding current control section 38 and the welding current control section 38 changes welding conditions in response to the current supply end signal EN1 and the bad signals NS1 and NS2.

The supply of current is ended when the change amount Ha in the distance P between the electrodes has reached a reference change amount value Hra after start of supply of current or when the current supply time has reached a maximum current supply time Tmax which is a maximum time during which supply of current can be permitted, even if the change amount Ha has not reached the reference change amount value Hra. Depending upon whether or not the change amount Hb in the distance between the electrodes during the hold time has reached the reference change amount value Hrb, the welding current control section 38 controls factors including the magnitude of welding current and pressing force.

Figure 8:
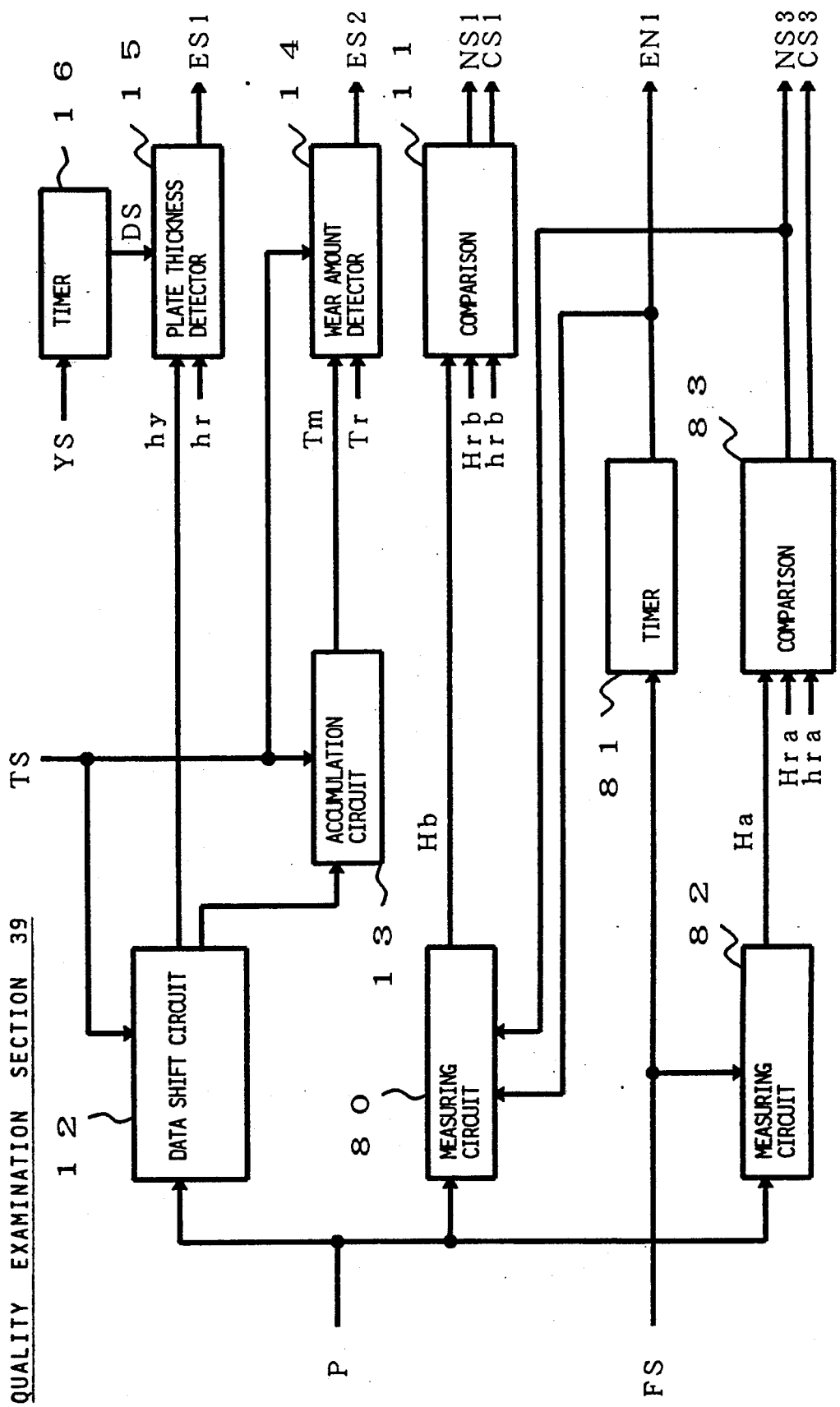
FIG. 8 is a block diagram showing a specific example of the quality examination section in FIG. 7.
Figure 9:
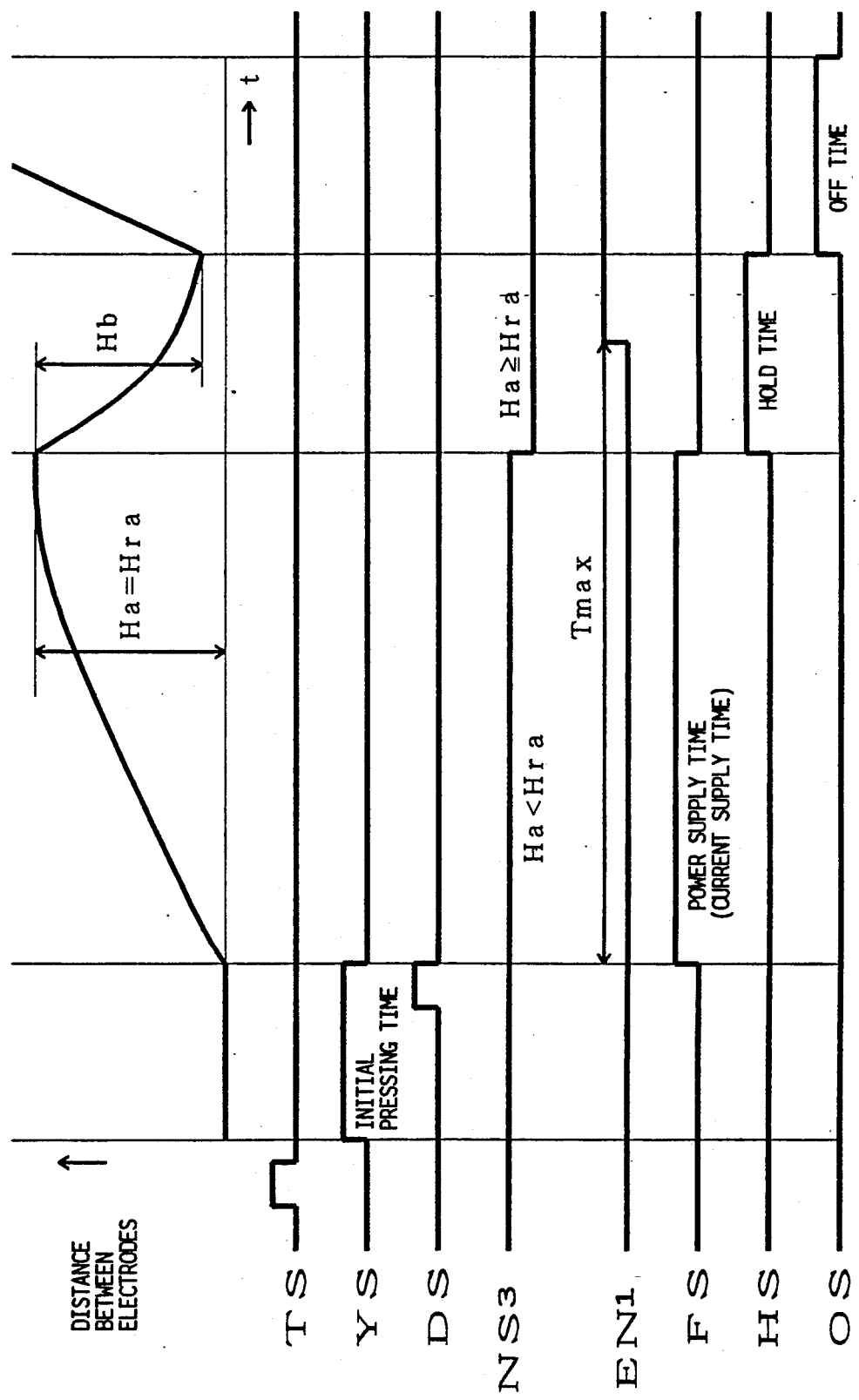
FIG. 9 is a block diagram showing the operation of the quality examination section shown in FIG. 8.
Figure 10:
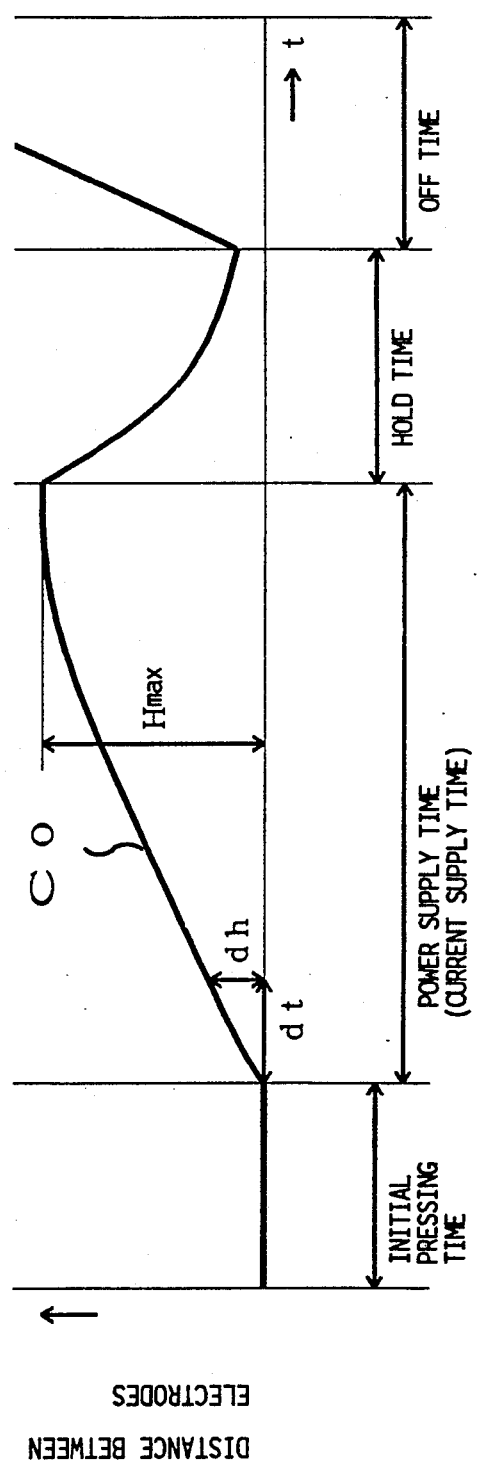
FIG. 10 is a graph showing change in the distance between electrodes in respective steps in spot welding for explaining the prior art methods for checking a spot welded portion.

The quality examination section 39 will be described more fully below with reference to FIGS. 8 and 9. FIG. 8 shows an outline of the quality examination section 39. Since the same components as those in FIG. 1 are designated by the same reference characters, description thereof will be omitted. FIG. 9 is a time chart showing its operation.

A timer 81 outputs the current supply end signal EN1 to a measuring circuit 80 and the welding current control section 38 after lapse of the maximum current supply time Tmax from rising edge of the current supply signal FS. In response to the current supply end signal EN1, the welding current control section 38 compulsorily ends the supply of current and proceeds to the processing of the hold time.

Since the measuring circuit 82 and a comparison circuit 83 are of the same structure as those in FIG. 5, description of these circuits will be omitted. The bad signal NS3 of the comparison circuit 83 is supplied to the welding current control section 38 and also to the measuring circuit 80.

The measuring circuit 80 receives the current supply end signal EN1 from the timer 81 and the bad signal NS3 from the comparison circuit 83 and resets its internal register to start measuring of the change amount in the distance P between the electrodes at a time point when the current supply end signal EN1 has been produced by the timer 81 or when the bad signal NS3 from the comparison circuit 83 has been inverted from a bad signal to a good signal.

The operation of the quality examination section in FIG. 8 will be described with reference to the time chart of FIG. 9.

The tip wear amount detection designation signal TS is produced, for example, every 200 times of spot welding. The data shift circuit 12 performs shifting so that the value of the distance-between-electrodes signal P becomes "0" upon rising edge of the tip wear amount detection designation signal TS. The accumulation circuit 13 accumulates the shift amount of the data shift circuit 12 upon falling of the tip wear amount detection designation signal TS and the wear amount detector 14 compares the wear signal Tm of the accumulation circuit 13 with the reference wear amount value Tr.

Upon rising edge of the initial pressing signal YS, the timer 16 starts counting of a predetermined time and supplies a plate thickness detection designation signal DS to the plate thickness detector 15 upon the end of counting of the time. During outputting of this initial pressing signal YS, a predetermined pressing force is applied to the tip electrodes 32 and 33.

Upon outputting of the plate thickness detection designation signal DS from the timer 16, the plate thickness detector 15 compares the plate thickness signal hy from the data shift circuit 12 with the plate thickness reference value hr.

When the plate thickness bad signal ES1 from the plate thickness detector 15 or the tip change signal ES2 from the wear amount detector 14 is not produced, the welding current control section 38 produces the current supply signal FS and supplies predetermined welding current to the tip electrodes 32 and 33.

As the welding current control section 38 supplies the welding current to the tip electrodes 32 and 33, the change amount Ha in the distance P between the electrodes increases gradually and, when the change amount Ha has reached the reference change amount value Hra of the comparison circuit 83, the bad signal NS3 of the comparison circuit 83 is inverted to a good signal at this time point. In response to this inversion of the bad signal NS3, the welding current control section 38 ends the supply of the welding current and immediately produces the hold signal HS.

The measuring circuit 80 resets its internal register upon inversion of the bad signal NS3 from the comparison circuit 83 and thereupon starts measurement of the change amount Hb in the distance between the electrodes during the hold time.

Upon rising edge of the hold time signal HS, the measuring circuit 10 resets its internal register and ends measurement upon falling of the hold time signal HS. The measuring circuit 10 thereby measures the contraction amount Hb of the plates 30 and 31 to be joined which have contracted during the hold time, i.e., the change amount in the distance between the electrodes. The comparison circuit 11 compares this contraction amount Hb with the reference contraction value Hrb. When the contraction amount Hb has exceeded the reference contraction value Hrb, the quality of joint is good whereas when the contraction amount Hb has not reached the reference contraction value Hrb, the quality of a joint is not good and the bad signal NS1 is produced.

In the meanwhile, the timer 81 starts counting of time in synchronism with rising edge of the current supply signal and produces the current supply end signal EN1 when the current supply time has reached the maximum current supply time Tmax. In this embodiment, however, the supply of current has ended by the inversion of the bad signal NS3 from the comparison circuit 83 and therefore the current supply end signal EN1 of the timer 81 is ignored.

Conversely, when the change amount Ha in the distance between the electrodes has not reached the reference change value Hra of the comparison circuit 83 before lapse of the maximum current supply time Tmax, supply of current is ended by the current supply end signal EN1 from the timer 81, the hold time signal HS rises, and the measuring circuit 80 resets its internal register to start measurement of the change amount Hb in the distance between the electrodes during the hold time.

In response to the release signal OS, the tip electrodes 32 and 33 release the plates 30 and 31.

In response to a series of signals from generation of the initial pressing signal YS till generation of the release signal OS, the welding current control section 38 repeats spot welding. The welding current control section 38 generates the tip wear amount detection designation signal TS, for example, every 200 times of spot welding and detects the amount of wear of the tip electrodes 32 and 33.

In response to the bad signals NS1 and NS3 from the comparison circuits 11 and 83, the welding current control section 38 establishes welding conditions in spot welding in the following manner:

First, there is a case where neither the bad signal NS1 nor NS3 is generated. In this case, the quality of a joint is considered to be good, so that the welding conditions are not changed.

Secondly, there is a case where the bad signal NS1 is not generated but the bad signal NS3 only is generated. This fact signifies that the change amount Ha has not reached the reference change amount Hra notwithstanding that the welding current has been supplied till the maximum current supply time Tmax, so that the welding conditions are changed. More specifically, a control is made so that the value of the welding current will be increased or decreased to enable the change amount Ha to reach the reference change value Hra within the maximum current supply time Tmax during next spot welding.

Thirdly, there is a case where the bad signal NS1 only is produced and the bad signal NS3 is not produced. This fact signifies that the contraction amount Hb has not reached the reference contraction value Hrb notwithstanding that the change amount Ha has reached the reference change value Hra, so that the welding conditions are changed. More specifically, a control is made so that pressing force to the tip electrodes 32 and 33 will be increased or decreased to enable the contraction amount Hb to reach the reference contraction value Hrb during next spot welding.

Fourthly, there is a case where neither the bad signal NS1 nor NS3 is generated. This fact signifies that the change amount Ha has not reached the reference change value Hra and the contraction amount Hb has not reached the reference contraction value Hrb, so that the welding conditions are changed. More specifically, the value of the welding current and pressing force are increased or decreased so as to prevent occurrence of these bad signals during next spot welding.

In the second, third and fourth cases described above, when the same result of examination as in the preceding spot welding has been obtained in next spot welding, the tip change signal is supplied to the display section to urge the operating person to replace the tip electrodes 32 and 33.

In the embodiment of FIG. 8, the welding conditions have been established on the basis of the change amount Ha and the contraction amount Hb. Alternatively, the welding conditions may be established on the basis of the result of examination of the quality of a joint as shown in FIG. 5. Further, not only the welding current and pressing force, but the maximum current supply time Tmax may be controlled.

An embodiment of the spot welding machine which can be used in the present invention will be described with reference to the drawings. This spot welding machine is adapted to detect the distance between the electrodes with high precision even during the spot welding work and, for this purpose, has a different construction from conventional spot welding machines.

Figure 11:
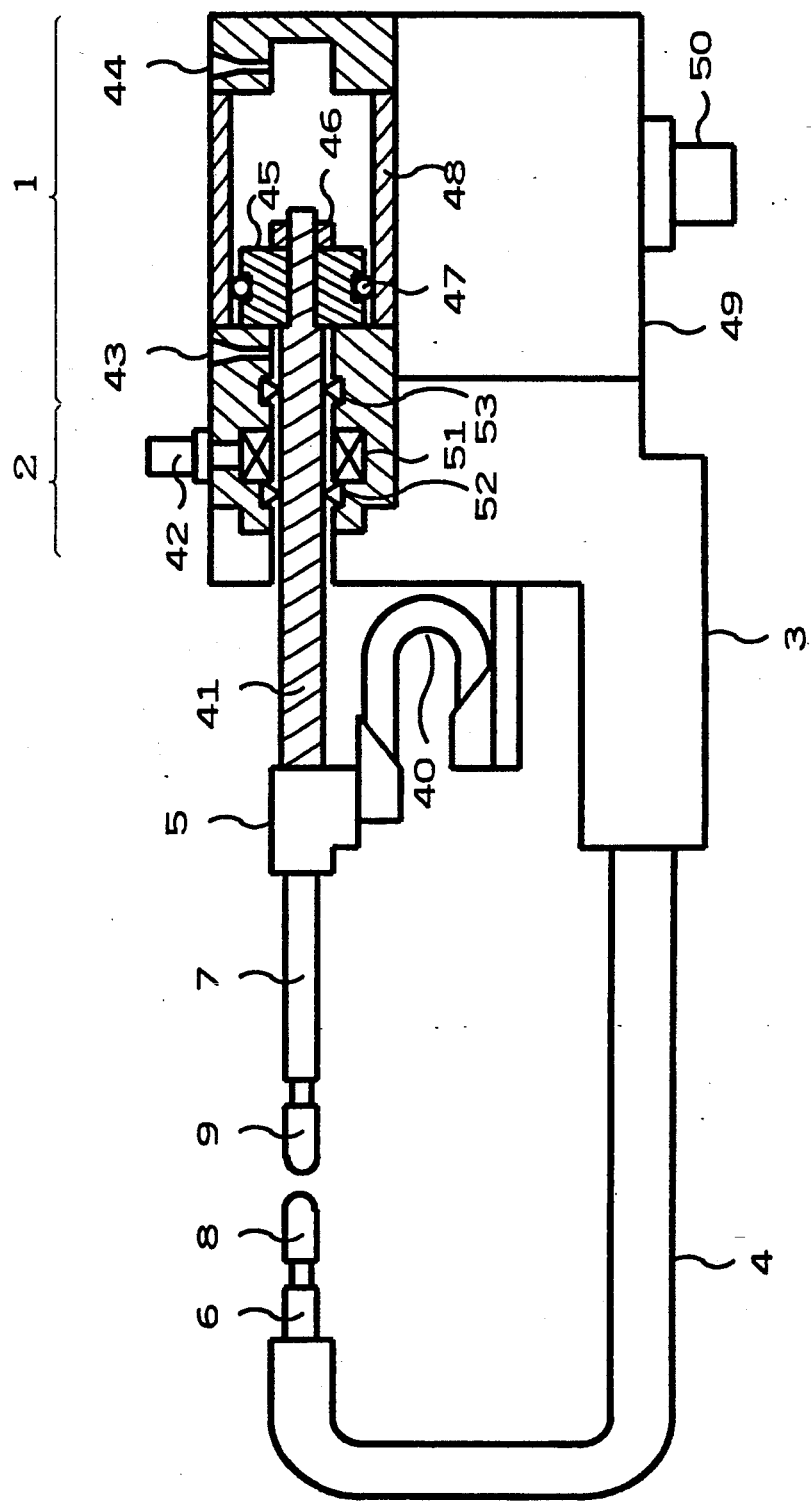
FIG. 11 is a side view, partly in section, showing schematically entire structure of an embodiment of the spot welding machine according to the invention.

FIG. 11 shows schematically the entire structure of the spot welding machine according to the invention. The spot welding machine of this embodiment is a portable type spot welding machine which is composed of a C-shaped welding gun and a welding transformer 49 formed integrally with each other. A pressing cylinder 1 and a position detector 2 of the spot welding machine are shown in section.

The welding gun includes the pressing cylinder 1, the position detector 2, an arm support member 3, an arm 4, a movable arm 5, electrode holders 6 and 7, tip electrodes 8 and 9 and a secondary conductor 40.

The portions of the welding gun other than the cylinder rod 41 of the pressing cylinder 1 and the position detector 2 are the same as the conventional welding guns and, therefore, these portions will be only briefly described.

The arm support member 3 holds the pressing cylinder 1, position detector 2, arm 4 and welding transformer 49.

The arm 4 is of an L-shape and has the electrode holder 6. The arm 4 which receives pressing force from the pressing cylinder 1 is made with such rigidity that it will not be flexed by the pressing force.

The movable arm 5 is fixed to the foremost end portion of the cylinder rod 41 and is moved with the cylinder rod 41. The movable arm 5 holds the electrode holder 7 on the opposite side of the cylinder rod 41, connecting the electrode holder 7 electrically to the secondary conductor 40.

The tip electrodes 8 and 9 are inserted in the holders 6 and 7 and held thereby.

The tip electrodes 8 and 9 are in contact with plates to be joined with a predetermined pressing force and supply welding current between the plates to perform spot welding.

The secondary conductor 40 supplies welding current from the welding transformer 49 to the electrode holder 7 and tip electrode 9. Supply of current to the electrode holder 6 and tip electrode 8 is made through a secondary conductor (not shown) provided inside of the arm support member 3 and arm 4.

The welding transformer 49 is connected to an external control device through a connector 50. Illustration of a device for cooling the tip electrodes 8 and 9 is omitted.

The position detector 2 is a phase-shift type detector detecting the amount of displacement of the cylinder rod 41 by a coil assembly 51 and the specially processed cylinder rod 41. This position detector 2 detects the distance between the tip electrodes 8 and 9 by detecting the amount of displacement of the cylinder rod 41 with respect to a position of contact of the tip electrodes 8 and 9. This position detector is described in detail in Japanese Preliminary Utility Model Publication No. 57-135917, Japanese Preliminary Utility Model Publication No. 58-136718, Japanese Preliminary Utility Model Publication No. 59-175105, U.S. Pat. No. 4,804,913 and European Patent No. 0212628. Packings 52 and 53 are provided on both sides of the coil assembly 51 for sealing off air of the pressing cylinder 1. Various data for position detection are applied to or provided from the coil assembly 51 through the connector 2.

In the pressing cylinder 1, pressure is applied to a piston 45 in a cylinder tube 48 by an air pressure flowing through ports 43 and 44 to move the cylinder rod 41 and thereby open or close the interval between the tip electrodes 8 and 9. The piston 45 is fastened to the cylinder rod 41 by means of a nut 45 and an O-ring 47 is provided around the piston 45 for sealing. O-rings (not shown) are also provided on both ends of the cylinder tube 48. The construction of the pressing cylinder 41 is the same as that of the conventional pressing cylinder except for the cylinder rod 41.

A unique feature of the spot welding machine according to this embodiment as compared with the conventional welding machine is that the position detector 2 which detects the amount of displacement of the cylinder rod 41 of the pressing cylinder 1 in an absolute value is provided and the distance between the tip electrodes 8 and 9 is detected from an output of this position detector 2. Since the position detector 2 is provided integrally with the pressing cylinder 1 which applies pressing force to the tip electrodes 8 and 9, the distance between the tip electrodes can be detected in a simple manner without the necessity for modifying the structure of the welding gun.

Figure 12:
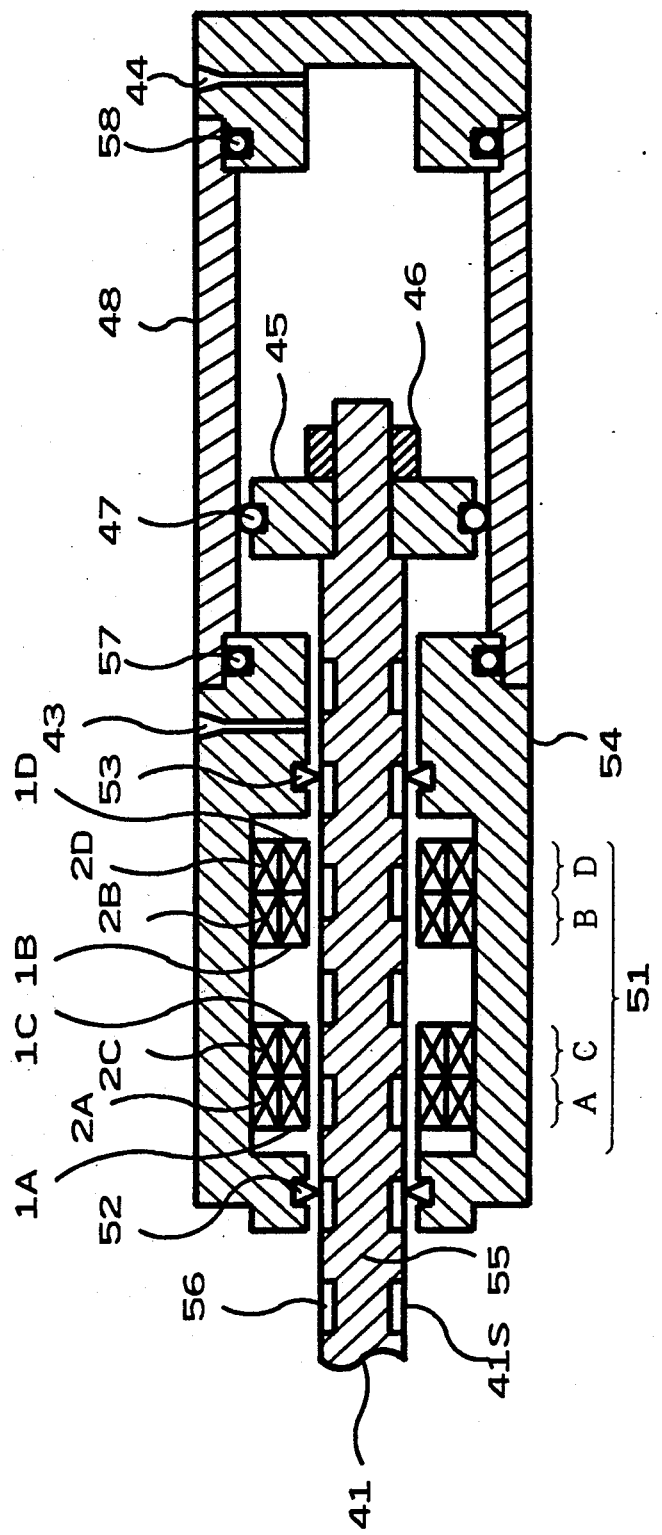
FIG. 12 is a sectional view showing a specific example of a pressing cylinder and a position detector shown in FIG. 11.
Figure 13:
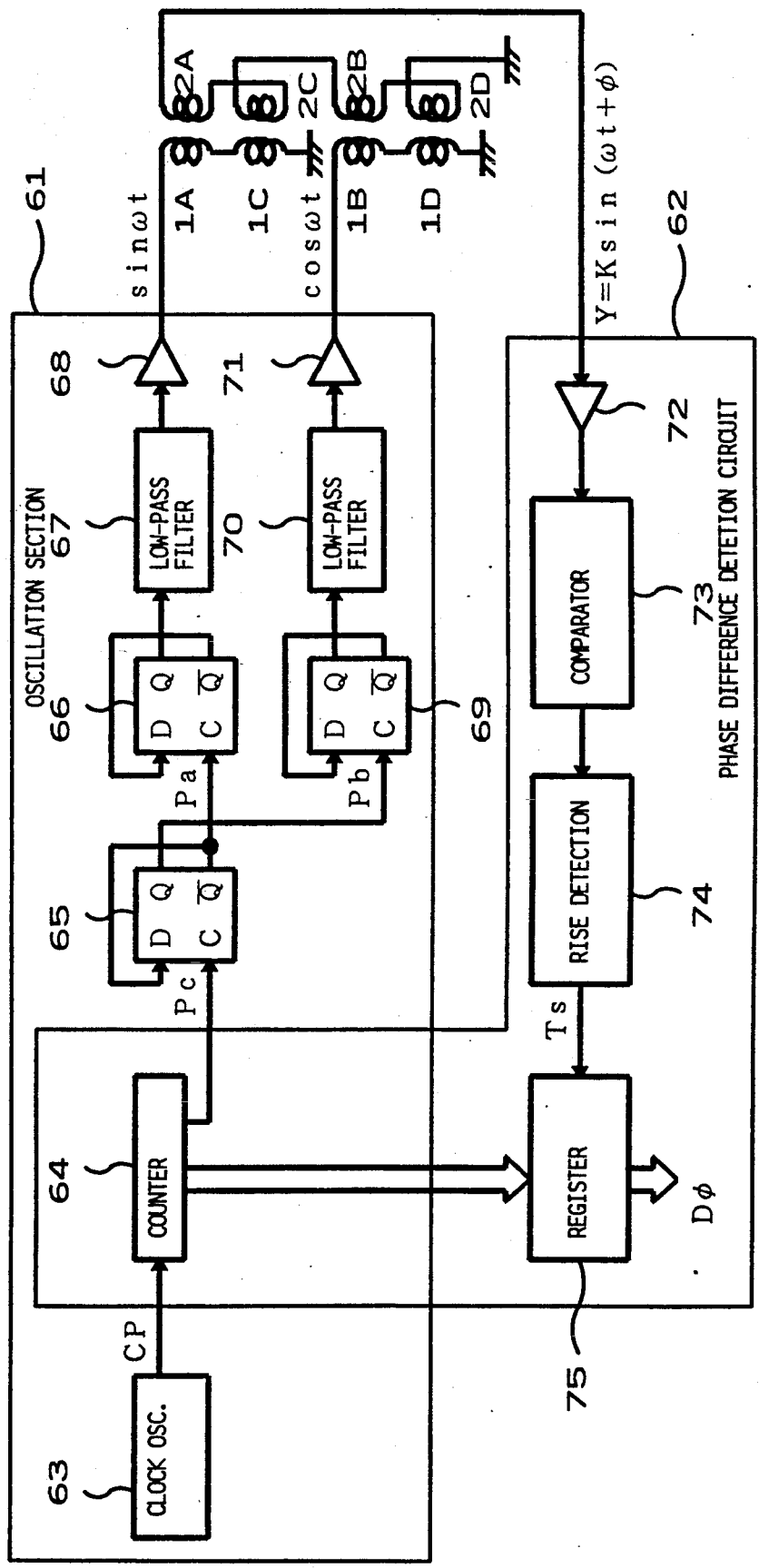
FIG. 13 is a block diagram showing an example of a position data conversion circuit for converting a detection signal from the position detector in FIG. 11 to a position signal.

A specific example of the pressing cylinder 1 and the position detector 2 is shown in FIG. 12. The wirings of the coil assembly 51 and construction of a position conversion section of the position detector 2 is shown in FIG. 13.

Since details of the position detector 2 is known by Japanese Preliminary Utility Model Publication No. 57-135917, Japanese Preliminary Utility Model Publication No. 58-136718, Japanese Preliminary Utility Model Publication No. 59-175105, U.S. Pat. No. 4,804,913 or European Patent No. 0212628, an only brief description will be made here. In FIG. 12, the same component parts as those in FIG. 11 are designated by the same reference characters and description thereof will be omitted. O-rings 57 and 58 are those for sealing illustration of which has been omitted in FIG. 11.

The position detector 2 detects a linear position by a phase shift system and comprises the coil assembly 51 and the cylinder rod 41.

The coil assembly 51 consists of four primary coils 1A, 1C, 1B and 1D which are disposed with a predetermined interval therebetween in the axial direction of the cylinder rod 41 and secondary coils 2A, 2C, 2B and 2D which are provided in correspondence to the primary coils 1A, 1C, 1B and 1D. The coil assembly 51 is fixed to a casing 54 so that a cylindrical space formed in the coil assembly 51 becomes concentrical with the cylinder rod 41.

The cylinder rod 41 comprises a magnetic graduation section 41S provided in the peripheral portion thereof. The magnetic graduation section 41S is composed of a magnetic substance portion 55 and annular non-magnetic substance portions 56 of a predetermined length which are provided alternately with the magnetic substance portion 55 in the axial direction of the cylinder rod 41. These magnetic substance portion 55 and non-magnetic substance portions 56 may be made of any material so long as they can provide reluctance change to a magnetic circuit formed in the coil assembly 51. For example, the non-magnetic substance portions 56 may be made of a non-magnetic substance or air. Alternatively, by causing change in magnetic property by applying laser baking to the rod 41 made of iron, the magnetic substance portion 55 and non-magnetic substance portions 56 may be alternately formed.

Assuming, for example, that the length of one coil is "P/2" (P being any number), the interval for one pitch in the alternate arrangement of the magnetic substance portion 55 and the non-magnetic substance portions 56 is equally "P/2". In that case, the length of the magnetic substance portion 55 and the length of the non-magnetic substance portion 56 may be equally "P/2" or may not be equal.

In the present embodiment, the coil assembly 51 is so constructed that it is operated with four phases. For convenience of explanation, these phases will be distinguished from one another by using reference characters A, B, C and D.

The positional relation between the cylinder rod 41 and the coil assembly 51 is so arranged that reluctance produced in the respective phases A to D of the coil assembly 51 is shifted by 90 degrees in accordance with the position of the magnetic substance portion 55 of the cylinder rod 41. If, for example, the phase A is a cosine (cos) phase, the phase C will be a minus cosine ($-\cos$) phase, the phase B a sine (sin) phase and the phase D a minus sine ($-\sin$) phase, respectively.

In the example of FIG. 12, the primary coils 1A, 1C, 1B and 1D and the secondary coils 2A, 2C, 2B and 2D are provided for the respective phases A to D. The secondary coils 2A, 2C, 2B and 2D of the respective phases A to D are wound on the outside of the primary coils 1A, 1C, 1B and 1D.

The length of the primary coils 1A, 1C, 1B and 1D and the length of the secondary coils 2A, 2C, 2B and 2D are "P/2" as described above. In the example of FIG. 12, the coils 1A and 2A of the phase A are provided adjacent to the coils 1C and 2C of the phase C and the coils 1B and 2B of the phase B are provided adjacent to the coils 1D and 2D of the phase D. The interval between the coils of the phase A and the coils of the phase B or the interval between the coils of the phase C and the coils of the phase D is "P(n±¼)" (n being any natural number).

According to this construction, reluctance of the magnetic circuit in the respective phases A to D changes periodically with the distance "P" being one period in accordance with the linear displacement of the cylinder rod 41 and, moreover, the phase of reluctance change can be shifted by 90 degrees for each of the phases A to D. Accordingly, there is phase difference of 180 degrees between the phase A and the phase C and also between the phase B and the phase D.

Connections between the primary coils 1A, 1C, 1B and 1D and the secondary coils 2A, 2C, 2B and 2D are shown in FIG. 13. In FIG. 13, connection is made so that the primary coils 1A and 1C of the phases A and C are excited in the same phase by a sine signal sin $\omega t$ and outputs of the secondary coils 2A and 2C are added together in opposite phases. Similarly, connection is made so that the primary coils 1B and 1D are excited in the same phase by a cosine signal cos $\omega t$ and outputs of the secondary coils 2B and 2D are added in opposite phases. Outputs of the secondary coils 2A, 2C, 2B and 2D are finally added together and loaded in a phase difference detection circuit 62 as an output signal Y.

This output signal Y is equal to a signal obtained by phase-shifting a reference ac signal (sin $\omega t$, cos $\omega t$) by a phase angle $\phi$ corresponding to a linear position of the magnetic substance portion 55 in the cylinder rod 41. This is because reluctance of the phases A to D is different in phase by 90 degrees and the electric phase of one pair (A, C) of the coils is different from that of the other pair (B, D). Therefore, the output signal Y is Y=K sin ($\omega t + \phi$) (where K is a constant).

The phase of the reluctance change is proportional to the linear position of the magnetic substance portion 55 in accordance with a predetermined proportion coefficient (or function) and, therefore, the linear position can be detected by measuring the phase difference $\phi$ from the reference signal sin $\omega t$ (or cos $\omega t$) in the output signal Y. However, when the phase difference amount $\phi$ is complementary angle $2\pi$, the linear position corresponds to the above described distance P. In other words, an absolute linear position within the range of the distance P can be detected by the electrical phase difference amount $\phi$. By measuring this electrical phase difference amount $\phi$, the linear position within the range of the distance P can be detected accurately with a considerably high resolution.

The magnetic graduation section 41S in the rod 41 may be made of not only the magnetic substance portion 55 and the non-magnetic substance portions 56 but other material which can produce reluctance change. For example, the magnetic graduation section 41S may be made of a combination of a highly conductive material such as copper and a relatively low conductive material such as iron (or non-conductive material), i.e., a combination of materials of different conductivity to produce reluctance change corresponding to eddy current loss. In that case, a pattern of a conductive material may be formed by copper plating, for example, on the surface of the rod 41 made, for example, of iron. The pattern may be of any shape if it can produce reluctance change effectively.

Means for detecting the phase difference amount $\phi$ between the output signal Y and the reference signal sin $\omega t$ (or cos $\omega t$) may be suitably constructed. FIG. 13 shows an example of a circuit which obtains this phase difference amount $\phi$ in a digital amount.

In FIG. 13, an oscillation section 61 is a circuit which produces a reference sine signal sin $\omega t$ and a reference cosine signal cos $\omega t$ and a phase difference detection circuit 62 is a circuit which measures the phase difference amount $\phi$.

A clock pulse CP provided by a clock oscillator 63 is counted by a counter 64. The counter 64 is, for example, of modulo M and a counted value of the counter 64 is supplied to a register 75. A pulse Pc derived by frequency-dividing the clock pulse CP by 4/M is provided from an output derived by frequency-dividing the counted value of the counter 64 by 4/M and is supplied to a C input of a flip-flop 65 for ½ frequency dividing.

A pulse Pb which is provided from an output Q of the flip-flop 65 is applied to a flip-flop 69 and a pulse Pa which is provided from an inverted output *Q of the flip-flop 65 is applied to a flip-flop 66. Outputs of the flip-flops 66 and 69 are supplied as the sine signal sin $\omega t$ and the cosine signal cos $\omega t$ to the coil assembly 51 through low-pass filters 67 and 70 and amplifiers 68 and 71.

A count M in the counter 64 corresponds to a phase angle of $2\pi$ radian of these reference signals sin $\omega t$, cos $\omega t$. In other words, one count of the counter 64 represents a phase angle of $2\pi/M$ radian.

The output signal Y of the coil assembly 51 is applied to a comparator 73 through an amplifier 72 and a square wave signal corresponding to a positive or negative polarity of the output signal Y is provided by the comparator 73. Upon rising of the output signal of the comparator 73, a pulse Ts is produced by a rise detection circuit 74 and the count of the counter 64 is written into a register 75 in response to this pulse Ts. As a result, a digital value D$\phi$ corresponding to the phase difference amount $\phi$ is loaded in the register 75. The linear position of the cylinder rod 41 can thereby be detected accurately in an absolute value.

Another embodiment of the spot welding machine according to the invention will now be described.

Figure 14:
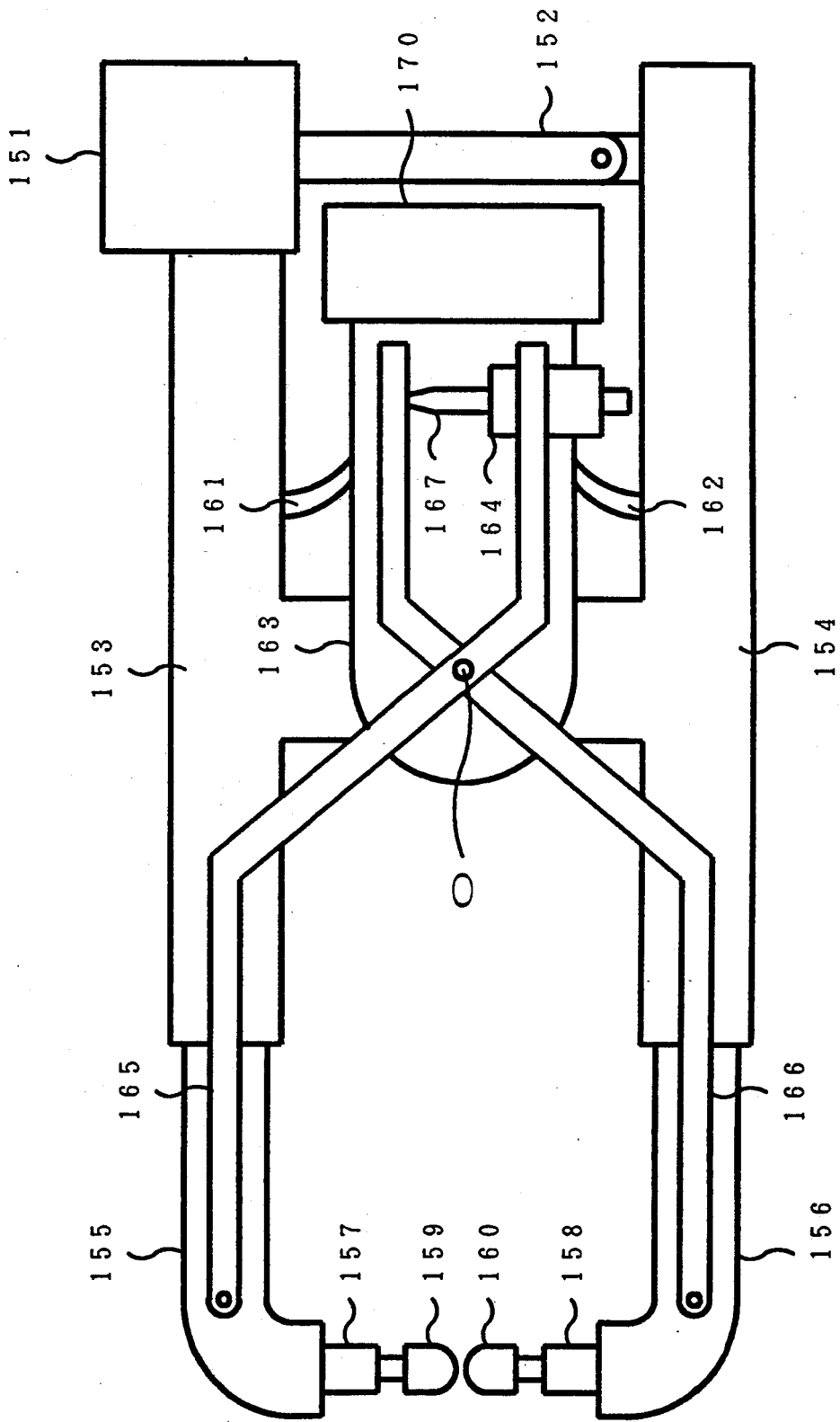
FIG. 14 is a side view showing entire structure of another embodiment of the spot welding machine according to the invention.

FIG. 14 shows a portable type spot welding machine in which an X-shaped welding gun and a welding transformer are formed integrally with each other.

The welding gun comprises a pressing cylinder 151, a cylinder rod 152, an upper arm support member 153, a lower arm support member 154, an upper arm 155, a lower arm 156, electrode holders 157 and 158, tip electrodes 159 and 160, secondary conductors 161 and 162, a transformer support member 163, a position detector 164, position detection arms 165 and 166 and a position detection rod 167.

The portions of the welding gun other than the position detector 164, position detection arms 165 and 166 and position detection rod 167 are the same as those of the conventional welding gun and description of these portions will be only briefly described.

The pressing cylinder 151 is of the same construction as the pressing cylinder 1 of FIG. 11. That is, pressure is applied to a piston in a cylinder tube by air pressure flowing through two ports and the cylinder rod 152 is thereby moved. Since the cylinder rod 152 and the lower arm support member 154 are rotatably connected to each other through a pin, the lower arm support member 154 is rotated about a pivot O by a linear displacement of the cylinder rod 162 and the tip electrodes 159 and 160 are thereby opened or closed.

The upper arm support member 153 holds the pressing cylinder 151 at one end and the upper arm 155 at the other end. The lower arm support member 154 has a member which is rotatably connected to the cylinder rod 152 of the pressing cylinder 151 at one end and holds the lower arm 156 at the other end. The upper arm support member 153 and the lower arm support member 154 form an X shape, the same shape as a pair of scissors, and are rotatable about the pivot O.

The upper arm 155 and the lower arm 156 are respectively of an L shape and hold the electrode holders 157 and 158 at the foremost end portions thereof. The linear arm portion formed by the upper arm support member 153 and the upper arm 155 and the linear arm portion formed by the lower arm support member 154 and the lower arm 156 are subject to pressing force applied by the pressing cylinder 151 and, therefore, these linear portions are made of a material having a sufficient rigidity to prevent flexing of the arm portions.

The electrode holders 157 and 158 hold the tip electrodes 159 and 160 which are inserted therein.

The secondary conductors 161 and 162 supply welding current from the welding transformer 170 to the electrode holders 157 and 158 and the tip electrodes 159 and 160. The welding transformer 170 is connected to an outside control device through a connector. Illustration of a device for cooling the tip electrodes 159 and 160 is omitted.

The position detector 164 is basically of the same construction as the position detector 2 of FIG. 11 and is a detector of a phase shift type for detecting the amount of displacement of the position detection rod 167. The position detector 164 is made of a coil assembly and the position detection rod 167 which is specially processed. The position detection rod 167 is constructed to return to an original position by force of a spring (not shown). That is, the position detector 164 which is of the construction shown in FIG. 12 has a spring provided therein and the rod is constantly urged toward the inner wall surface on one side.

Accordingly, the position detection rod 167 tends to spread the position detection arms 165 and 166 outwardly by the force of the spring provided in the position detection rod 167. When the angle between the position detection arms 165 and 166 has increased, the position detection rod 167 is moved by the spring provided therein. In this manner, the relative positional relation between the coil assembly of the position detector 164 and the position detection rod 167 changes and, therefore, the position detector 164 can detect the linear displacement amount thereof as the amount of displacement of the position detection arms 165 and 166.

The position detection arms 165 and 166 convert the linear displacement amount between the tip electrodes 159 and 160 to the linear displacement amount of the position detection rod 167. Therefore, the position detector 164 can detect the amount of rotation of the position detection arms 165 and 166, i.e., the displacement amount between the tip electrodes 159 and 160 by detecting the linear displacement amount of the position detection rod 167. The position detector 164 detects the distance between the tip electrodes 159 and 160 by detecting the amount of displacement of the position detection rod 167 with respect to a position at which the tip electrodes 159 and 160 are in contact with each other. Details about this position detector 164 are disclosed in Japanese Preliminary Utility Model Publication No. 57-135917, Japanese Preliminary Utility Model Publication No. 58-136718, Japanese Preliminary Utility Model Publication No. 59-175105, U.S. Pat. No. 4,804,913 or European Patent No. 0212628.

Figure 15:
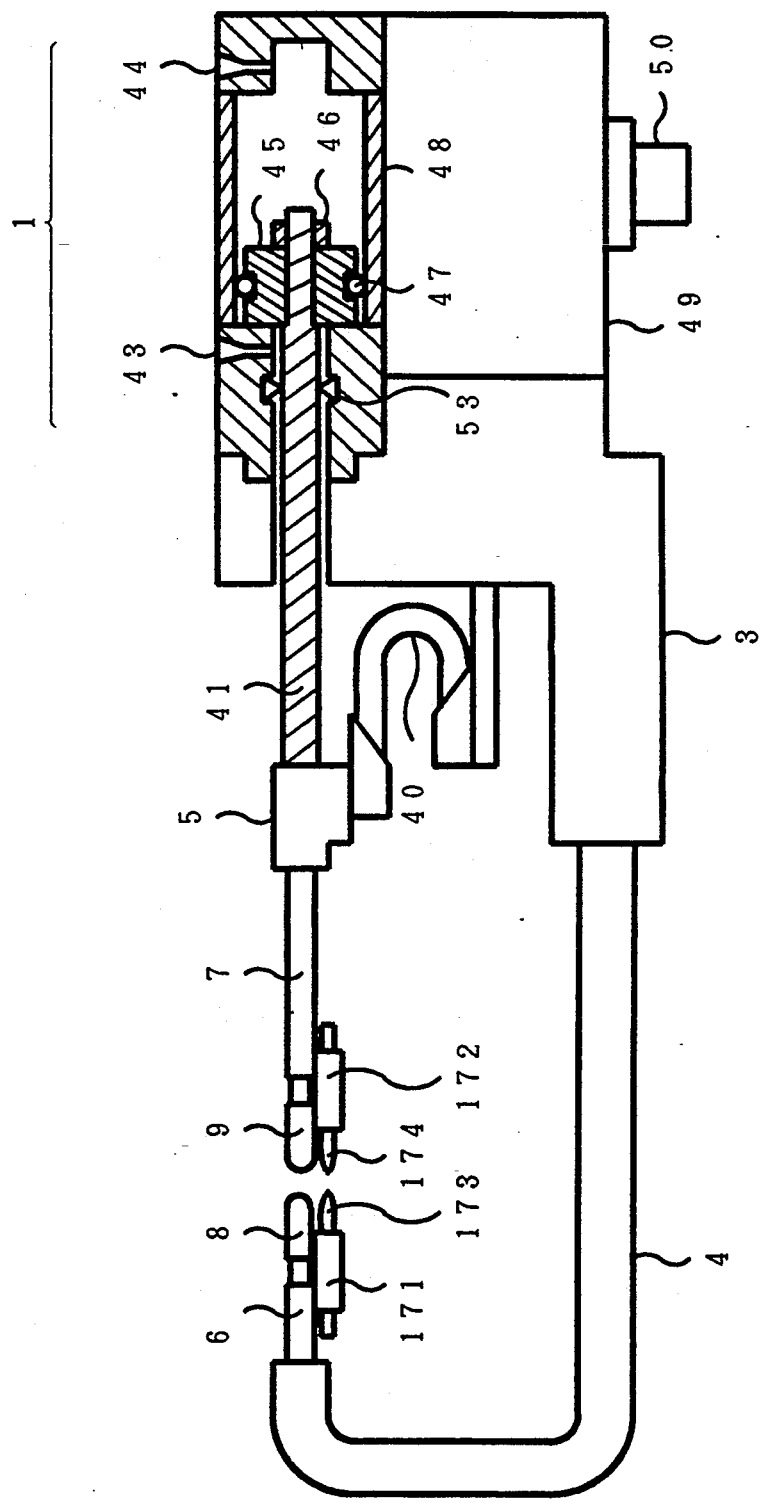
FIG. 15 is a side view, partly in section, showing a modified example of the spot welding machine in FIG. 11 in which position detectors are provided in the vicinity of tip electrodes.

FIG. 15 shows a modified example of the spot welding machine shown in FIG. 11. In FIG. 15, the same components as those in FIG. 11 are designated by the same reference characters and description thereof will be omitted.

The spot welding machine shown in FIG. 11 can detect the distance between the electrodes accurately so long as the arm support member 3 and the arm 4 have sufficient rigidity to stand flexion by the pressing force applied by the pressing cylinder 1. For constructing such arm support member 3 and arm 4, however, the arm must have a very large diameter and a metal of a very high rigidity must be employed. This results in a very high manufacturing cost for manufacturing such arm support member and arm.

FIG. 15 shows a spot welding machine which can measure the distance between the electrodes 8 and 9 accurately even when some deformation has occurred in the arm support member 3 and the arm 4 due to expansion and contraction of plates to be welded. The spot welding machine of FIG. 15 has, instead of the position detector 2 of FIG. 11, position detectors 171 and 172 which are of the same construction as the position detector 164 of FIG. 14 provided respectively on the holder 8 and tip electrode 8, and the holder 7 and tip electrode 9. The position detectors 171 and 172 therefore are moved with the arm 4 in an interlocked motion with deformation or flexion of the arm 4 and the arm support member 3.

Position detection rods 173 and 174 of the position detectors 171 and 172 are in contact with a portion of plates to be joined which does not expand or contract during welding and, therefore, when the position detectors 171 and 172 are moved by movement of the arm 4 due to expansion and contraction of the welded portion of the plates to be joined, the position detection rods 173 and 174 maintain the state of contact with the plates owing to the force of the springs provided therein. This brings about change in the relative positional relation between the coil assembly in the position detectors 171 and 172 and the position detection rods 173 and 174 and the position detectors 171 and 172 can thereby detect the distance between the mounting position of the position detectors 171 and 172 and the plates to be joined which has changed due to expansion and contraction of the plates. By operating (i.e., adding or subtracting) position detection values of the two position detectors 171 and 172, change in the distance between the tip electrodes 8 and 9 can be accurately measured.

Figure 16:
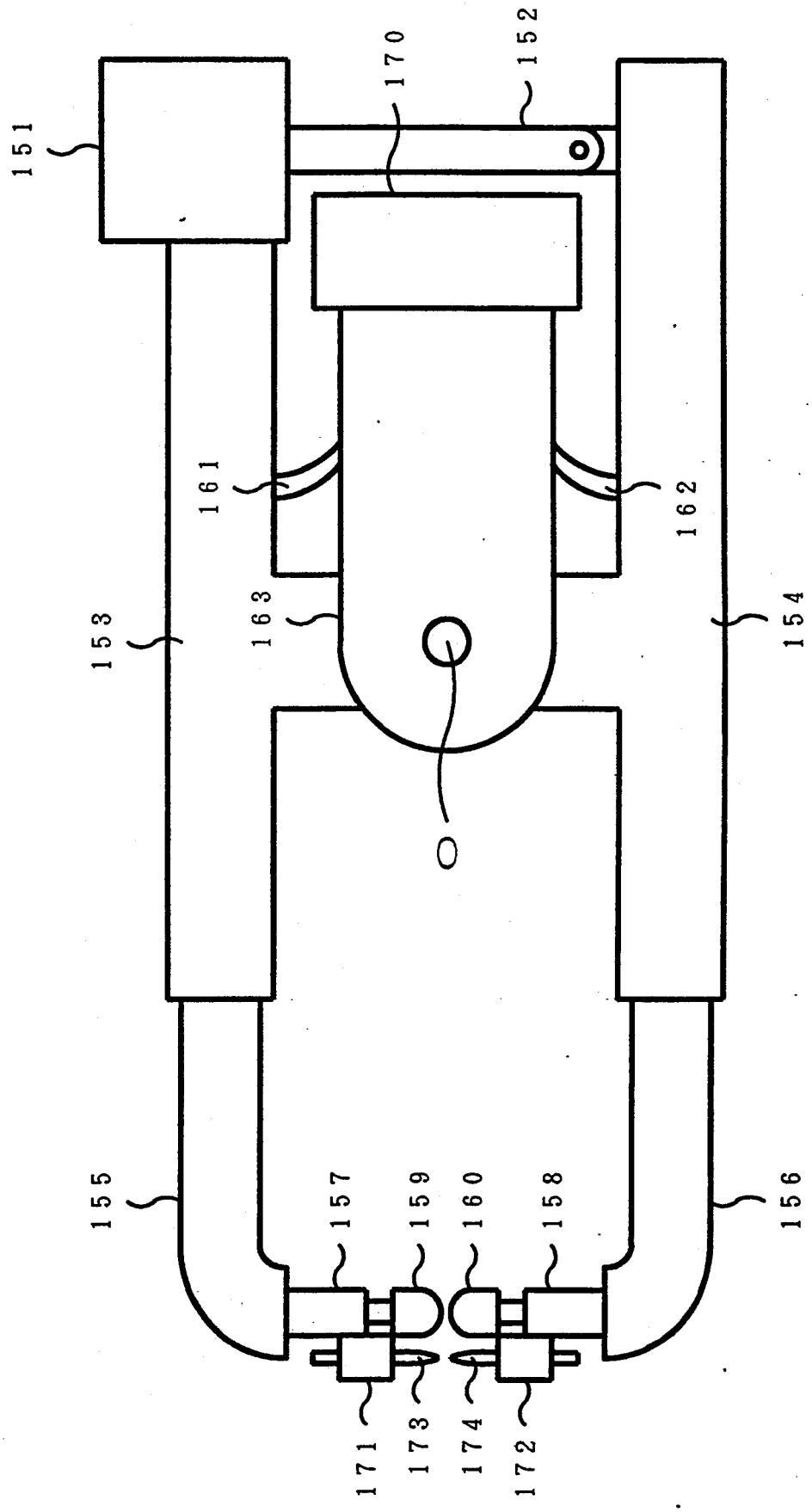
FIG. 16 is a schematic side view showing a modified example of the spot welding machine in FIG. 14 in which position detectors are provided in the vicinity of tip electrodes.

FIG. 16 shows a modified example of the spot welding machine shown in FIG. 14. In FIG. 16, the same components as those in FIG. 14 are designated by the same reference characters and description thereof will be omitted.

The embodiment of FIG. 14 can detect the distance between the electrodes accurately by the separately provided position detection arms 165 and 166 even when rigidity of the upper arm support member 153, lower arm support member 154, upper arm 155 and lower arm 156 is insufficient and they are readily deformed by the pressing force of the pressing cylinder 151. FIG. 16 shows a modification of such spot welding machine. The spot welding machine shown in FIG. 16 has, in the same manner as the embodiment of FIG. 15, two position detectors 171 and 172 provided on holders 157 and 158 on the side of the tip electrodes 159 and 160. By operating position detection values of the two position detectors 171 and 172, the distance between the tip electrodes 159 and 160 can be accurately measured.

Figure 17:
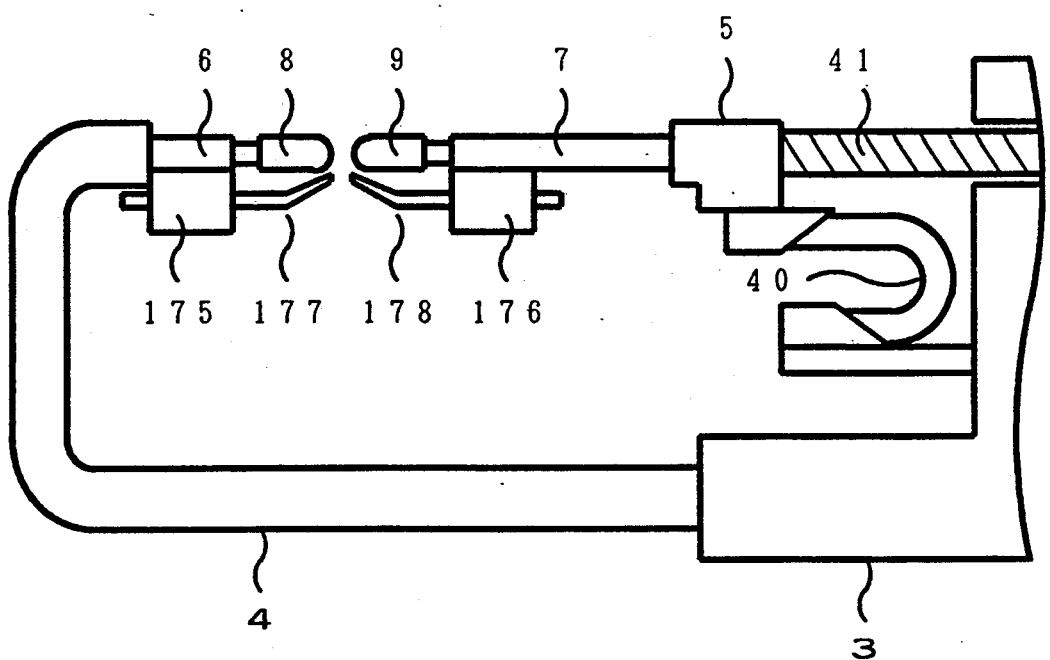
FIG. 17 is a schematic side view showing, in an enlarged scale, a modified example of a position detection rod of the position detectors used in the spot welding machine in FIG. 15.

FIG. 17 shows a modified example of the position detectors 171 and 172 used in the spot welding machine of FIG. 15. FIG. 17 shows a left side portion of FIG. 15 only. In FIG. 17, the same components as those in FIG. 15 are designated by the same reference characters and description thereof will be omitted.

The position detectors 175 and 176 of FIG. 17 are different from the position detectors 171 and 172 in that the main bodies of the position detectors 175 and 176 are mounted on the holders 6 and 7 which are spaced from the tip electrodes 8 and 9 so as not to hamper the welding work and position detection rods 177 and 178 have a bent shape with their tip portions being disposed in the vicinity of the tip electrodes 8 and 9.

Figure 18:
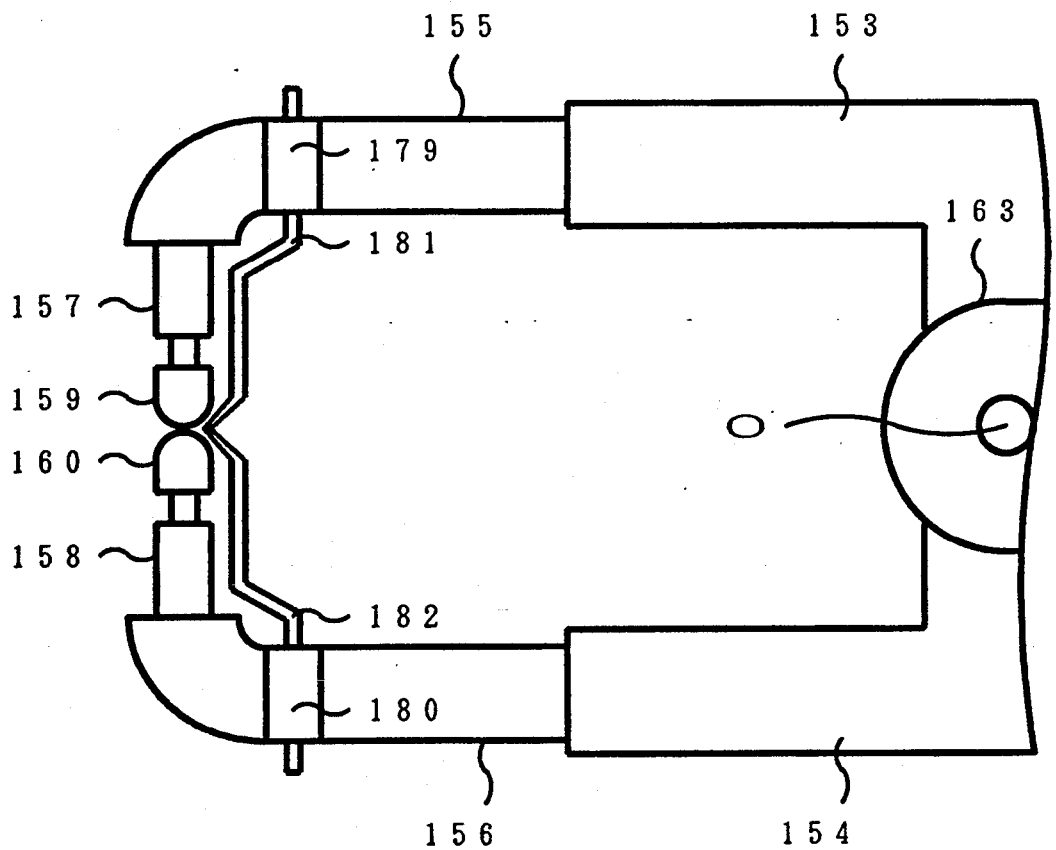
FIG. 18 is a schematic side view showing, in an enlarged scale, a modified example of a position detection rod of the position detectors used in the spot welding machine in FIG. 16.

FIG. 18 shows a modified example of the position detectors 171 and 172 used in the spot welding machine of FIG. 16. FIG. 18 shows a left side portion of FIG. 16 only. In FIG. 18, the same components as those in FIG. 16 are designated by the same reference characters and description thereof will be omitted.

The position detectors 179 and 180 of FIG. 18 are different from the position detectors 171 and 172 in that the main bodies of the position detectors 179 and 180 are mounted on one side of the upper arm 155 and the lower arm 156 which are spaced from the tip electrodes 156 and 160 so as not to hamper the welding work and position detection rods 181 and 182 have a bent shape with their tip portions being disposed in the vicinity of the tip electrodes 159 and 160.

In the examples of FIGS. 17 and 18 in which the position detectors 175, 176, 179 and 180 are located at positions which are spaced from the spot welded portion and the position detection rods 177, 178, 181 and 182 have a bent shape, the position detectors 175, 176, 179 and 180 do not hamper the welding work. Further, since the position detectors 177, 178, 181 and 182 including the electrical system are spaced from the spot welded portion, adverse effects such as occurrence of noise during the welding work are reduced. It is necessary in these examples that the position detection rods 175, 176, 179 and 180 are constructed so as not to rotate with respect to the position detectors 175, 176, 179 and 180.

The above description has been made about the embodiments in which the portable type welding gun is used as the spot welding machine. The invention however is applicable to any type of spot welding machine if it is of a type in which pressing force is generated by a pressing cylinder.

In the embodiment of FIG. 14, the pivot point of the position detection arms 165 and 166 is coincidental with the pivot point of the welding gun. However, these pivot points need not necessarily be coincidental. The position detector 164 may be provided between the fixing point of the position detection arms 165 and 166 and the upper arm 155 and the lower arm 156 and the pivot O.

The position detector 164 in FIG. 14 is a linear position detector. Alternatively, a rotational position at the pivot O of the upper arm support member 153 and the lower arm support member 154 or the position detection arms 165 and 166 may be detected directly by using a rotational position detectors of a phase shift type. As this type of rotational position detector, one disclosed in Japanese Preliminary Patent Publication No. 57-70406 or U.S. Pat. No. 4,754,220, for example, may be employed.

In the spot welding machine shown in FIG. 14, the position detector 2 and the cylinder rod 41 as shown in FIG. 11 may be provided on the pressing cylinder 151 to detect the displacement amount of the cylinder rod 152.

The spot welding machine shown in FIG. 11 may be provided with the position detection arm as shown in FIG. 14.

In the above described embodiments, the coil section consists of four phases of A to D. The invention however is not limited to this but the coil section may consist of two phases, three phases or any number of phases greater than one.

In the embodiment of FIG. 13, the phase difference amount $\phi$ is detected digitally but this amount may be detected in an analog manner.

In the above described embodiments, the magnetic graduation section is formed directly on the rod. Alternatively, the magnetic graduation section may be provided separately from the rod at a position where the magnetic graduation section is moved in an interlocked motion with the rod.

In the embodiments of FIGS. 15 and 17, the position detectors are mounted on the inside of the arms and in the embodiment of FIG. 16, the position detectors are mounted on the outside of the arms. In the embodiment of FIG. 18, the position detectors are mounted on one side surface of the arms. These mounting positions are shown only by way of example and the position detectors should actually be mounted on a proper position (such as the inside, outside or a side surface of the arms) depending upon a welding environment.

In the embodiments of FIGS. 15 and 16, the position detection rods are linearly formed but the position detections rods having a bent shape as shown in FIG. 18 may be used in the embodiment of FIGS. 15 and 16, the position detectors are mounted on the tip electrodes and the holders. Alternatively, the position detectors may be mounted on the arms as shown in FIG. 17 or 18.

In the spot welding machine of FIG. 11, the position detector 171 shown in FIG. 15 may be mounted on the holder 6 and the tip electrode 8. In this case, the position detector 2 detects the displacement amount of the movable arm 5 and the position detector 171 detects the displacement amount of the arm 4 and, therefore, change in the distance between the electrodes during welding can be detected with as high accuracy as in the embodiments of FIGS. 15, 16 and 17 in which the position detectors are provided on the two arms.

In carrying out the spot welding system of the invention which has been described with reference to FIGS. 1 through 9, not only the spot welding machines shown in FIGS. 11 through 18 but any other type of welding machine, plate thickness detection means or distance-between-electrodes detection means may be employed.

As described in the foregoing, according to the checking method of the invention, the quality of joint of the spot welded portion can be examined accurately.

Since the checking method of the invention is a non-destructive type method, welding conditions can be established automatically while watching the state of joint and spot welding can be made while maintaining a good quality of joint in the welded portion by employing the checking method according to the invention.

Further, according to the spot welding machine of the invention, change in the distance between electrodes during spot welding can be accurately detected without affecting the efficiency of the spot welding work and, accordingly, the quality of joint in the spot welded portion which has been considered extremely difficult in the past can be easily examined.

What is claimed is:

1. A method for checking the quality of spot welding performed for fixedly attaching at least two plates together by placing the plates on each other, holding the plates between two electrodes, and supplying power to the electrodes while applying pressure thereto, comprising the steps of:
    (a) detecting a decrease in thickness of the plates at the spot welded portion thereof at a predetermined time period while application of pressure is still maintained and after termination of power supply;
    (b) obtaining a value by integrating, during the predetermined time period, the thickness of the plates at the spot welded portion, the thickness changing during the predetermined time period; and
    (c) examining the quality of a joint at the spot welded portion on the basis of an amount of detected decrease and the integrated value.

2. The method as claimed in claim 1 wherein the thickness of the plates to be joined is detected on the basis of distance between two electrodes.

3. The method as claimed in claim 1 wherein said step (a) detects the decrease in thickness of the plates in accordance with a difference between the thickness of the plates immediately after termination of power supply and the thickness of the plates at a time point when the predetermined time period has ended.

4. The method as claimed in claim 1 further comprising the steps of:
    (d) obtaining an amount of change between the thickness of the plates at a time point when supply of power has ended and the thickness of the plates at a time point when supply of power has started; and
    (e) examining the quality of a joint at the spot welded portion on the basis of the amount of change in the thickness of the plates.

5. The method as claimed in claim 1 further comprising the steps of:
    (d) obtaining an amount of change between the thickness of the plates at a time point when the predetermined time period has ended and the thickness of the plates at a time point when supply of power has started; and
    (e) examining the quality of a joint at the spot welded portion on the basis of the amount of change in the thickness of the plates.

6. The method as claimed in claim 1 further comprising the steps of:
    (d) detecting the thickness of the plates to be joined which has been placed on each other before start of supply of power; and
    (e) detecting whether the number of the plates to be joined is a predetermined number.

7. The method as claimed in claim 1 further comprising the steps of:
    (d) measuring the distance between the two electrodes absolutely; and
    (e) detecting, after a predetermined number of spot welding operations has been performed, an amount of wear of tip portions of the electrodes caused by spot welding.

8. The method as claimed in claim 1 wherein said step (b) obtains the value by integrating, during the predetermined time period, an amount of decrease in thickness of the plates at the spot welded portion.

9. A method for checking the quality of spot welding performed for fixedly attaching at least two plates together by placing the plates on each other, holding the plates between two electrodes, and supplying power to the electrodes while applying pressure thereto, comprising the steps of:
    (a) detecting a decrease in thickness of the plates at the spot welded portion thereof at a predetermined time period while application of pressure is still maintained and after termination of power supply;
    (b) obtaining a value by integrating, during a time period when power is supplied, the value of thickness of the plates which changes for the time period when power is supplied; and
    (c) examining the quality of a joint at the spot welded portion on the basis of an amount of detected decrease and the integrated value.

10. A method for checking the quality of spot welding performed for fixedly attaching at least two plates together by placing the plates on each other, holding the plates between two electrodes, and supplying power to the electrodes while applying pressure thereto, comprising the steps of:
    (a) detecting a decrease in thickness of the plates at the spot welded portion thereof at a predetermined time period while application of pressure is still maintained and after termination of power supply;

(b) obtaining a value by dividing a first value which is obtained by integrating, during the predetermined time period when application of pressure is still maintained and after termination of power supply, the thickness of the plates at the spot welded portion which changes for the predetermined time period, by a second value which is obtained by integrating, during a time period when power is supplied, the thickness of the plates which changes for the time period when power is supplied; and (c) examining the quality of a joint at the spot welded portion on the basis of an amount of detected decrease and the obtained value of said step (b).

11. A method for checking the quality of spot welding performed for fixedly attaching at least two plates together by placing the plates on each other, holding the plates between two electrodes, and supplying power to the electrodes while applying pressure to these plates, comprising the steps of:

(a) obtaining a value based on integrating, during a predetermined time period while application of pressure is still maintained and after termination of power supply, thickness of the plates at the spot welded portion, the thickness changing during the predetermined time period; and (b) examining the quality of a joint at the spot welded portion on the basis of the value obtained in said step (a).

12. The method ad claimed in claim 11 wherein the thickness of the plates to be joined is detected on the basis of distance between two electrodes.

13. The method as claimed in claim 11 further comprising the steps of:

(c) obtaining an amount of change between the thickness of the plates at a time point when supply of power has ended and the thickness of the plates at a time point when supply of power has started; and (d) examining the quality of a joint at the spot welded portion on the basis of the amount of change in the thickness of the plates.

14. The method as claimed in claim 11 further comprising the steps of:

(c) obtaining an amount of change between the thickness of the plates at a time point when the predetermined time period has ended and the thickness of the plates at a time point when supply of power has started; and (d) examining the quality of a joint at the spot welded portion on the basis of the amount of change in the thickness of the plates.

15. The method as claimed in claim 11 further comprising the steps of:

(c) obtaining a value by integrating, during a time period when power is supplied, the value of thickness of the plates which changes during the time period when power is supplied; and (d) examining the quality of a joint at the spot welded portion on the basis of the integrated value.

16. The method as claimed in claim 11 further comprising the steps of:

(c) obtaining a value by dividing a first value which is obtained by integrating, during the predetermined time period when application of pressure is still maintained after termination of power supply, the thickness of the plates at the spot welded portion which changes during the predetermined time period, by a second value which is obtained by integrating during a time period when power is supplied the thickness of the plates which changes during the time period when power is supplied; and (d) examining the quality of a joint at the spot welded portion on the basis of the value.

17. The method as claimed in claim 11 further comprising the steps of:

(c) detecting the thickness of the plates to be joined which has been placed on each other before start of supply of power; and (d) detecting whether the number of the plates to be joined is a predetermined number.

18. The method as claimed in claim 11 further comprising the steps of:

(c) measuring the distance between two electrodes absolutely; and (d) detecting, after a predetermined number of spot welding operations has been performed, an amount of wear of tip portions of the electrodes caused by spot welding.

19. A spot welding control system for welding at least two plates together by placing the plates on each other, holding the plates between two electrodes, and supplying power to the electrodes while applying pressure to these plates, said control system comprising:

examination means for obtaining a value by integrating, during a predetermined time period when application of pressure is still maintained after termination of power supply, a thickness of the plates at the spot welded portion, the thickness changing during said predetermined time period, and for examining the quality of a joint at the spot welded portion on the basis of the integrated value; and control means for controlling spot welding conditions in response to said examination means.

20. The spot welding control system as claimed in claim 19 wherein said spot welding conditions are conditions from a group of conditions including a magnitude of welding current produced by a power supply, a time period for supplying power, and the pressure applied to the plates.

21. The spot welding control system as claimed in claim 19 wherein said examination means detects a decrease in thickness of the plates at the spot welded portion thereof at a predetermined time period while application of pressure is still maintained and after termination of the supplied power and examines the quality of joint at the spot welded portion on the basis of an amount of detected decrease.

22. A spot welding machine comprising:

first and second tip electrodes for holding therebetween plates to be joined with a pressing force of a predetermined magnitude and causing current to flow through the plates;

first and second arms for supporting the first and second tip electrodes and transmitting the pressing force of the predetermined magnitude to the first and second tip electrodes;

a pressing cylinder for moving at least one of the first and second arms to apply the pressing force to said plates via said tip electrodes; and distance-between-electrodes detection means for detecting a distance between the first and second tip electrodes by detecting a stroke position of the pressing cylinder;

said distance-between-electrodes detection means including, a coil section having at least a primary coil surrounding said pressing cylinder which is excited by a predetermined ac signal, a magnetic section provided in a rod of the pressing cylinder so as to change reluctance in a magnetic path of said coil section in accordance with displacement of the rod, and a position detection circuit for obtaining data representing the position of the rod on the basis of a change in reluctance in the magnetic path of said coil section produced by a relative positional relationship between said magnetic section and said coil section.

23. The spot welding matching as claimed in claim 22 wherein said coil section includes plural primary coils and plural secondary coils; and said position detection circuit including, a circuit for exciting the primary coils by reference ac signals which are out of phase from one another, an output circuit for summing outputs of the secondary coils and generating an output signal by phase-shifting the reference ac signals in accordance with a relative linear position of the rod, and a circuit for detecting a phase difference between a predetermined reference ac signal and the output signal from the output circuit and providing the detected phase difference data as the rod position data.

24. The spot welding machine as claimed in claim 22 wherein said magnetic section consists of two repeatedly arranged materials of different magnetic permeability.

25. The spot welding machine as claimed in claim 22 wherein said magnetic section consists of two repeatedly arranged materials of different conductivity.

26. The spot welding machine as claimed in claim 22 consisting of a C-shaped welding gun.

27. The spot welding machine as claimed in claim 22 consisting of an X-shaped welding gun.

28. A spot welding machine comprising:

first and second tip electrodes for holding therebetween plates to be joined with a pressing force of a predetermined magnitude and causing current to flow through the plates;

first and second arms for supporting the first and second tip electrodes and transmitting the pressing force of the predetermined magnitude to the tip electrodes;

pressing means for moving at least one of the first and second arms to apply the pressing force to said plate via said tip electrodes; and distance-between-electrodes detection means for detecting distance between the first and second tip electrodes by detecting displacement of the first and second arms relative to the plates, said arms being moved in accordance with expansion and contraction of the plates during welding;

said distance-between-electrodes detection means including, first and second position detection arms connected rotatably at one end thereof to the first and second arms in such a manner that the first and second position detection arms are rotated about pivot points in accordance with movement of the first and second position detection arms, distance-between-arms detection means, provided between the first and second position detection arms, for detecting the displacement of the first and second arms relative to the plates by detecting displacement of the first and second position detection arms which are rotated in accordance with movement of the first and second arms.

29. The spot welding machine as claimed in claim 28 wherein said distance-between-arms detection means includes:

a rod provided so that one end thereof normally contacts the first position detection arm in a resilient manner;

a coil section provided on the second position detection arm, having at least a primary coil which is excited by a predetermined ac signal and being coupled magnetically to the rod;

a magnetic section provided in the rod so as to change reluctance in a magnetic path in the coil section in accordance with movement of the rod; and a position detection circuit for obtaining data representing the position of the rod based on a change in reluctance in the magnetic path in the coil section produced by a relative positional relationship between the magnetic section and the coil section.

30. The spot welding machine as claimed in claim 29 wherein said coil section includes plural primary coils and plural secondary coils; and said position detection circuit including, a circuit for exciting the primary coils by reference ac signals which are out of phase from one another, an output circuit for summing outputs of the secondary coils and generating an output signal by phase-shifting the reference ac signals in accordance with a relative linear position of the rod, and a circuit for detecting a phase difference between a predetermined reference ac signal and the output signal from the output circuit and providing the detected phase difference data as the rod position data.

31. The spot welding machine as claimed in claim 29 wherein said magnetic section consists of two repeatedly arranged materials of different magnetic permeability.

32. The spot welding machine as claimed in claim 29 wherein said magnetic section consists of two repeatedly arranged materials of different conductivity.

33. The spot welding machine as claimed in claim 28 consisting of a C-shaped welding gun.

34. The spot welding machine as claimed in claim 28 consisting of a X-shaped welding gun.

35. A spot welding machine comprising:

first and second tip electrodes for holding therebetween plates to be joined with a pressing force of a predetermined magnitude and causing current to flow through the plates;

first and second arms for supporting the first and second tip electrodes and transmitting the pressing force of the predetermined magnitude to the tip electrodes;

pressing means for moving at least one of the first and second arms to apply the pressing force to said plate via said tip electrodes; and distance-between-electrodes detection means for detecting distance between the first and second tip electrodes by detecting displacement of the first and second arms relative to the plates, said arms being moved in accordance with expansion and contraction of the plates during welding;

said distance between electrode detection means including, first and second detection means mounted on said first and second arms, respectively, for detecting respective displacement of said first and second arms relative to the plates;

said first or second detection means including, a rod provided so that one end thereof normally contacts the plates in a resilient manner, a coil section provided on the first or second arm, having at least a primary coil excited by a predetermined ac signal and being coupled magnetically to said rod, a magnetic section provided in an axial direction of said rod so as to change reluctance in a magnetic path in said coil section in accordance with movement of said rod, and a position detection circuit for obtaining data representing a position of said rod based on a change in reluctance in the magnetic path in said coil section produced by a relative positional relationship between said magnetic section and said coil section.

36. The spot welding machine as claimed in claim 35 wherein said coil section includes plural primary coils and plural secondary coils; and said position detection circuit including, a circuit for exciting the primary coils by reference ac signals which are out of phase from one another, an output circuit for summing outputs of the secondary coils and generating an output signal by phase-shifting the reference ac signals in accordance with a relative linear position of the rod, and a circuit for detecting a phase difference between a predetermined reference ac signal and the output signal from the output circuit and providing the detected phase difference data as the rod position data.

37. The spot welding machine as claimed in claim 35 wherein said magnetic section consists of two repeatedly arranged materials of different magnetic permeability.

38. The spot welding machine as claimed in claim 35 wherein said magnetic section consists of two repeatedly arranged materials of different conductivity.

39. An apparatus for checking a quality of spot welding performed for fixedly attaching at least two plates together by placing the plates on each other, holding the plates between two electrodes, and supplying power to the electrodes while applying pressure thereto, comprising:

detection means for detecting a thickness of the plates at the spot welded portion thereof by detecting a distance between the two electrodes;

said detection means including, a coil section having plural primary coils exited by respective reference ac signals which are out of phase from one another, a magnetism-responsive section movable relative to said coil section with displacement of the electrodes so as to change reluctance in a magnetic path in said coil section in accordance with the displacement of the electrodes, an output circuit for generating an output signal by phase-shifting the reference ac signals in accordance with the displacement of the electrodes based on an induced signal in said coil section, and a distance detection circuit for obtaining data representing the distance between the electrodes based on a phase difference between a predetermined reference ac signal and the output signal from the output circuit;

evaluating means for evaluating a decrease in the thickness of the plates at the spot welded portion thereof at a predetermined time period while application of pressure is still maintained and after termination of the supplied power based on change in the thickness detected by said detection means during the predetermined time period; and examining means for determining the quality of joint at the spot welded portion based on an amount of the decrease evaluated by said evaluating means.

40. The apparatus as claimed in claim 39, further comprising:

operating means for integrating the thickness detected by said detection means during the predetermined time period, the thickness changing during the predetermined time period;

said examining means determining the quality of joint at the spot welded portion based on an integrated value obtained by said operating means.

41. The apparatus as claimed in claim 39, further comprising:

operating means for obtaining an amount of change between the thickness of the plates at a point of time when supply of power has started and the thickness of the plates at a point of time when supply of power has ended;

said examining means determining the quality of joint at the spot welded portion based on the amount of change obtained by said operating means.

42. The apparatus as claimed in claim 39, further comprising:

operating means for obtaining an amount of change between the thickness of the plates at a point of time when supply of power has started and the thickness of the plates at a point of time when the predetermined time period has ended;

said examing means determining the quality of joint at the spot welded portion based on the amount of change obtained by said operating means.

43. The apparatus as claimed in claim 39, further comprising:

operating means for integrating the thickness detected by said detection by means during a time period when power is supplied, the thickness changing during the time period when power is supplied;

said examining means determining the quality of joint at the spot welded portion based on an integrated value obtained by said operating means.

44. The apparatus as claimed in claim 39, further comprising:

first operating means for obtaining a first value by integrating the thickness detected by said detection means during the predetermined time period while application of pressure is still maintained and after termination of the supplied power, the thickness changing during the predetermined time period;

second operating means for obtaining a second value by integrating the thickness detected by said detection means during a time period when power is supplied, the thickness changing during the tie period when power is supplied; and third operating means for obtaining a value by dividing the first value by the second value;

said examining means determining the quality of joint at the spot welded portion based on a value obtained by said third operating means.

45. The apparatus as claimed in claim 39, further comprising:

wear detecting means for detecting an amount of wear of tip portions of the electrodes caused by spot welding; and compensating means for compensating a value of the thickness detected by said detection means by the amount of wear detected by said wear detecting means.

46. The apparatus as claimed in claim 39, further comprising:

wear checking means for checking and detecting, after a predetermined number of spot welding operations have been performed, an amount of the wear of the tip portions of the electrodes caused by spot welding.

* * * * *